United States Patent
Rommel et al.

(10) Patent No.: US 12,269,498 B1
(45) Date of Patent: Apr. 8, 2025

(54) VEHICLE SPEED MANAGEMENT

(71) Applicant: Samsara Inc., San Francisco, CA (US)

(72) Inventors: Cassandra Lee Rommel, Chicago, IL (US); Casey Takahashi, San Francisco, CA (US); Ava O'Neill, San Francisco, CA (US); Matthew Basham, Oakland, CA (US); Salil Gupta, Brooklyn, NY (US); Xicheng Xiong, San Carlos, CA (US); Aaron Zeisler, San Jose, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/164,894

(22) Filed: Feb. 6, 2023

Related U.S. Application Data

(60) Provisional application No. 63/376,556, filed on Sep. 21, 2022.

(51) Int. Cl.
| | |
|---|---|
| *B60W 50/14* | (2020.01) |
| *B60W 40/02* | (2006.01) |
| *B60W 40/105* | (2012.01) |
| *B60W 50/00* | (2006.01) |

(Continued)

(52) U.S. Cl.
CPC ............ *B60W 50/14* (2013.01); *B60W 40/02* (2013.01); *B60W 40/105* (2013.01); *B60W 50/0098* (2013.01); *G06N 20/00* (2019.01); *H04W 4/44* (2018.02); *B60W 2050/0052* (2013.01); *B60W 2050/146* (2013.01); *B60W 2540/043* (2020.02); *B60W 2555/20* (2020.02);

(Continued)

(58) Field of Classification Search
None
See application file for complete search history.

(56) References Cited

U.S. PATENT DOCUMENTS

| | | | |
|---|---|---|---|
| 4,671,111 | A | 6/1987 | Lemelson |
| 5,825,283 | A | 10/1998 | Camhi |
| 5,917,433 | A | 6/1999 | Keillor et al. |

(Continued)

FOREIGN PATENT DOCUMENTS

| | | |
|---|---|---|
| CN | 105788323 A | 7/2016 |
| CN | 111047179 A | 4/2020 |

(Continued)

OTHER PUBLICATIONS

US 11,450,210 B2, 09/2022, Tsai et al. (withdrawn)

(Continued)

*Primary Examiner* — Muhammad Adnan
(74) *Attorney, Agent, or Firm* — Knobbe, Martens, Olson & Bear LLP

(57) ABSTRACT

An improved system and method of defining speeding severity levels, receiving over a wireless network from a vehicle device speed data and metadata, determining associated speeding severity levels, based at least in part on the determined associated speeding severity levels, determining whether an alert communication is to be transmitted the vehicle device, and in response to determining that an alert communication is to be transmitted the vehicle device, transmitting the alert communication via a wireless interface to the vehicle device, the alert communication configured to cause the vehicle device to provide a corresponding in-vehicle alert.

12 Claims, 13 Drawing Sheets

(51) Int. Cl.
*G06N 20/00* (2019.01)
*H04W 4/44* (2018.01)

(52) U.S. Cl.
CPC ..... *B60W 2555/60* (2020.02); *B60W 2556/40* (2020.02); *B60W 2556/45* (2020.02)

(56) References Cited

U.S. PATENT DOCUMENTS

| | | | |
|---|---|---|---|
| 6,064,299 A | 5/2000 | Lesesky et al. | |
| 6,098,048 A | 8/2000 | Dashefsky et al. | |
| 6,157,864 A | 12/2000 | Schwenke et al. | |
| 6,253,129 B1 | 6/2001 | Jenkins et al. | |
| 6,317,668 B1 | 11/2001 | Thibault et al. | |
| 6,411,203 B1 | 6/2002 | Lesesky et al. | |
| 6,421,590 B2 | 7/2002 | Thibault | |
| 6,452,487 B1 | 9/2002 | Krupinski | |
| 6,505,106 B1 | 1/2003 | Lawrence et al. | |
| 6,651,063 B1 | 11/2003 | Vorobiev | |
| 6,714,894 B1 | 3/2004 | Tobey et al. | |
| 6,718,239 B2 | 4/2004 | Rayner | |
| 6,741,165 B1 | 5/2004 | Langfahl et al. | |
| 6,801,920 B1 | 10/2004 | Wischinski | |
| 6,968,311 B2 * | 11/2005 | Knockeart | G06F 3/023 704/275 |
| 6,980,131 B1 * | 12/2005 | Taylor | G08G 1/20 340/988 |
| 7,091,880 B2 * | 8/2006 | Sorensen | G07B 15/063 705/13 |
| 7,117,075 B1 | 10/2006 | Larschan et al. | |
| 7,139,780 B2 | 11/2006 | Lee et al. | |
| 7,155,321 B2 * | 12/2006 | Bromley | G07C 5/008 701/32.7 |
| 7,174,243 B1 * | 2/2007 | Lightner | G08G 1/20 701/32.4 |
| 7,209,959 B1 | 4/2007 | Campbell et al. | |
| 7,233,684 B2 | 6/2007 | Fedorovskaya et al. | |
| 7,327,258 B2 * | 2/2008 | Fast | G08B 21/0291 340/572.1 |
| 7,386,376 B2 | 6/2008 | Basir et al. | |
| 7,389,178 B2 | 6/2008 | Raz et al. | |
| 7,398,298 B2 | 7/2008 | Koch | |
| 7,433,889 B1 * | 10/2008 | Barton | G08G 1/0104 |
| 7,492,938 B2 | 2/2009 | Brinson, Jr. et al. | |
| 7,526,103 B2 | 4/2009 | Schofield et al. | |
| 7,555,378 B2 | 6/2009 | Larschan et al. | |
| 7,596,417 B2 | 9/2009 | Fister et al. | |
| 7,606,779 B2 | 10/2009 | Brinson, Jr. et al. | |
| 7,715,961 B1 | 5/2010 | Kargupta | |
| 7,769,499 B2 | 8/2010 | McQuade et al. | |
| 7,844,088 B2 | 11/2010 | Brinson, Jr. et al. | |
| 7,859,392 B2 | 12/2010 | McClellan et al. | |
| 7,877,198 B2 | 1/2011 | Tenzer et al. | |
| 7,881,838 B2 | 2/2011 | Larschan et al. | |
| 7,957,936 B2 | 6/2011 | Eryurek et al. | |
| 8,019,581 B2 | 9/2011 | Sheha et al. | |
| 8,024,311 B2 | 9/2011 | Wood et al. | |
| 8,032,277 B2 | 10/2011 | Larschan et al. | |
| 8,140,358 B1 | 3/2012 | Ling et al. | |
| 8,156,108 B2 | 4/2012 | Middleton et al. | |
| 8,156,499 B2 | 4/2012 | Foulger et al. | |
| 8,169,343 B2 | 5/2012 | Sheha et al. | |
| 8,175,992 B2 | 5/2012 | Bass, II et al. | |
| 8,230,272 B2 | 7/2012 | Middleton et al. | |
| 8,260,489 B2 | 9/2012 | Nielsen et al. | |
| 8,417,402 B2 | 4/2013 | Basir | |
| 8,442,508 B2 | 5/2013 | Harter et al. | |
| 8,457,395 B2 | 6/2013 | Boncyk et al. | |
| 8,509,412 B2 | 8/2013 | Sheha et al. | |
| 8,543,625 B2 | 9/2013 | Middleton et al. | |
| 8,560,164 B2 | 10/2013 | Nielsen et al. | |
| 8,615,555 B2 | 12/2013 | Koch | |
| 8,625,885 B2 | 1/2014 | Brinson, Jr. et al. | |
| 8,626,568 B2 | 1/2014 | Warkentin et al. | |
| 8,633,672 B2 | 1/2014 | Jung et al. | |
| 8,669,857 B2 | 3/2014 | Sun et al. | |
| 8,682,572 B2 | 3/2014 | Raz et al. | |
| 8,706,409 B2 | 4/2014 | Mason et al. | |
| 8,831,825 B2 | 9/2014 | Shah et al. | |
| 8,836,784 B2 | 9/2014 | Erhardt et al. | |
| 8,918,229 B2 | 12/2014 | Hunt et al. | |
| 8,953,228 B1 | 2/2015 | Mehers | |
| 8,989,914 B1 | 3/2015 | Nemat-Nasser et al. | |
| 8,989,959 B2 | 3/2015 | Plante et al. | |
| 8,996,240 B2 | 3/2015 | Plante | |
| 9,024,744 B2 | 5/2015 | Klose et al. | |
| 9,053,590 B1 | 6/2015 | Kator et al. | |
| 9,137,498 B1 | 9/2015 | L'Heureux et al. | |
| 9,147,335 B2 | 9/2015 | Raghunathan et al. | |
| 9,152,609 B2 | 10/2015 | Schwartz et al. | |
| 9,165,196 B2 | 10/2015 | Kesavan et al. | |
| 9,170,913 B2 | 10/2015 | Hunt et al. | |
| 9,189,895 B2 | 11/2015 | Phelan et al. | |
| 9,230,250 B1 | 1/2016 | Parker et al. | |
| 9,230,437 B2 | 1/2016 | Brinton et al. | |
| 9,280,435 B2 | 3/2016 | Hunt et al. | |
| 9,311,271 B2 | 4/2016 | Wright | |
| 9,344,683 B1 | 5/2016 | Nemat-Nasser et al. | |
| 9,349,228 B2 | 5/2016 | Ochsendorf et al. | |
| 9,384,111 B2 | 7/2016 | Hunt et al. | |
| 9,389,147 B1 | 7/2016 | Lambert et al. | |
| 9,402,060 B2 | 7/2016 | Plante | |
| 9,412,282 B2 | 8/2016 | Hunt et al. | |
| 9,439,280 B2 | 9/2016 | Chang et al. | |
| 9,445,270 B1 | 9/2016 | Bicket et al. | |
| 9,477,639 B2 | 10/2016 | Fischer et al. | |
| 9,477,989 B2 | 10/2016 | Grimm et al. | |
| 9,527,515 B2 | 12/2016 | Hunt et al. | |
| 9,539,901 B1 * | 1/2017 | Clauss | G01C 21/3697 |
| 9,594,725 B1 | 3/2017 | Cook et al. | |
| 9,672,667 B2 | 6/2017 | Mason et al. | |
| 9,688,282 B2 | 6/2017 | Cook et al. | |
| 9,728,015 B2 | 8/2017 | Kwak | |
| 9,761,063 B2 | 9/2017 | Lambert et al. | |
| 9,761,067 B2 | 9/2017 | Plante et al. | |
| 9,811,536 B2 | 11/2017 | Morris et al. | |
| 9,818,088 B2 | 11/2017 | Penilla et al. | |
| 9,846,979 B1 | 12/2017 | Sainaney et al. | |
| 9,849,834 B2 | 12/2017 | Reed et al. | |
| 9,852,625 B2 | 12/2017 | Victor et al. | |
| 9,892,376 B2 | 2/2018 | Pfeiffer et al. | |
| 9,922,567 B2 | 3/2018 | Molin et al. | |
| 9,934,628 B2 | 4/2018 | Kreiner et al. | |
| 9,996,980 B1 | 6/2018 | Gonzalez et al. | |
| 10,015,452 B1 | 7/2018 | Schofield et al. | |
| 10,033,706 B2 | 7/2018 | Bicket et al. | |
| 10,040,459 B1 | 8/2018 | Kukreja | |
| 10,065,652 B2 | 9/2018 | Shenoy et al. | |
| 10,068,392 B2 | 9/2018 | Cook et al. | |
| 10,075,669 B2 | 9/2018 | Vanman et al. | |
| 10,083,547 B1 | 9/2018 | Tomatsu | |
| 10,085,149 B2 | 9/2018 | Bicket et al. | |
| 10,094,308 B2 | 10/2018 | Kolhouse et al. | |
| 10,096,038 B2 | 10/2018 | Ramirez et al. | |
| 10,102,495 B1 | 10/2018 | Zhang et al. | |
| 10,127,810 B2 | 11/2018 | Durie, Jr. et al. | |
| 10,157,321 B2 | 12/2018 | Becker et al. | |
| 10,157,422 B2 | 12/2018 | Jordan Peters et al. | |
| 10,173,486 B1 | 1/2019 | Lee et al. | |
| 10,173,544 B2 | 1/2019 | Hendrix et al. | |
| 10,196,071 B1 | 2/2019 | Rowson et al. | |
| 10,206,107 B2 | 2/2019 | Bicket et al. | |
| 10,223,935 B2 | 3/2019 | Sweany et al. | |
| 10,275,959 B2 | 4/2019 | Ricci | |
| 10,286,875 B2 | 5/2019 | Penilla et al. | |
| 10,290,036 B1 | 5/2019 | Gella et al. | |
| 10,311,749 B1 | 6/2019 | Kypri et al. | |
| 10,336,190 B2 | 7/2019 | Yokochi et al. | |
| 10,388,075 B2 | 8/2019 | Schmirler et al. | |
| 10,389,739 B2 | 8/2019 | Solotorevsky | |
| 10,390,227 B2 | 8/2019 | Bicket et al. | |
| 10,431,089 B1 * | 10/2019 | Nguyen | G05D 1/0061 |
| 10,444,949 B2 | 10/2019 | Scott et al. | |
| 10,445,559 B2 | 10/2019 | Joseph et al. | |

(56) References Cited

U.S. PATENT DOCUMENTS

| | | |
|---|---|---|
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,652,335 B2 | 5/2020 | Botticelli |
| 10,715,976 B2 | 7/2020 | Hoffner et al. |
| 10,730,388 B1 * | 8/2020 | Briggs .................. G07C 5/0816 |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,501,384 B2 * | 11/2022 | Kraft .................. G07C 5/0816 |
| 11,511,666 B2 * | 11/2022 | Javeri .................. G06V 20/58 |
| 11,522,857 B1 | 12/2022 | Symons et al. |
| 11,532,169 B1 | 12/2022 | Hassan et al. |
| 11,538,338 B2 * | 12/2022 | Morris ............ G08G 1/096741 |
| 11,548,390 B1 * | 1/2023 | Briggs .................. G07C 5/0808 |
| 11,558,449 B1 | 1/2023 | Bicket et al. |
| 11,587,441 B1 * | 2/2023 | Cheng .................. G07C 5/085 |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B1 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 2002/0021242 A1 * | 2/2002 | Flick ..................... G08G 1/127<br>342/357.395 |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0167591 A1 | 7/2006 | McNally |
| 2007/0050108 A1 | 3/2007 | Larschan et al. |
| 2007/0067086 A1 * | 3/2007 | Rothschild ............... G07C 5/02<br>701/93 |
| 2007/0173991 A1 | 7/2007 | Tenzer et al. |
| 2007/0208498 A1 * | 9/2007 | Barker .................. G08G 1/0969<br>701/117 |
| 2008/0120175 A1 * | 5/2008 | Doering .................. G06Q 30/02<br>701/123 |

(56) References Cited

U.S. PATENT DOCUMENTS

| | | |
|---|---|---|
| 2008/0252487 A1 | 10/2008 | McClellan et al. |
| 2008/0262670 A1* | 10/2008 | McClellan .......... G01S 5/0027 701/31.4 |
| 2008/0319602 A1 | 12/2008 | McClellan et al. |
| 2009/0024273 A1* | 1/2009 | Follmer .......... G06Q 10/10 701/33.4 |
| 2009/0048750 A1* | 2/2009 | Breed .......... G08G 1/161 701/70 |
| 2009/0079555 A1* | 3/2009 | Aguirre De Carcer .......... G07C 5/008 701/2 |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0121526 A1* | 5/2010 | Pham .......... B60W 30/146 340/441 |
| 2010/0205012 A1* | 8/2010 | McClellan .......... G07C 5/008 705/4 |
| 2010/0207787 A1 | 8/2010 | Catten et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0184588 A1 | 7/2011 | Brusilovsky et al. |
| 2011/0234749 A1 | 9/2011 | Alon |
| 2011/0276265 A1 | 11/2011 | Husain |
| 2011/0301802 A1* | 12/2011 | Rupp .......... G08G 1/096716 701/408 |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0328861 A1 | 12/2013 | Arikan et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0170602 A1* | 6/2014 | Reed .......... B60R 16/0231 434/62 |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0161886 A1* | 6/2015 | Kesting .......... G08G 1/01 701/117 |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2016/0046298 A1 | 2/2016 | DeRuyck et al. |
| 2016/0110066 A1 | 4/2016 | McCormick et al. |
| 2016/0114807 A1* | 4/2016 | Phelan .......... G08G 1/20 701/70 |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2017/0032480 A1* | 2/2017 | Wong .......... G06N 5/04 |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0051153 A1 | 2/2019 | Giurgiu et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0156266 A1* | 5/2019 | Hubbard .......... G06Q 10/06398 |
| 2019/0174158 A1 | 6/2019 | Herrick et al. |
| 2019/0186927 A1 | 6/2019 | Koponen et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0327613 A1 | 10/2019 | Bicket et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0057953 A1* | 2/2020 | Livny .......... G06F 21/554 |
| 2020/0074326 A1 | 3/2020 | Balakrishnan et al. |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |

(56) References Cited

U.S. PATENT DOCUMENTS

| | | | |
|---|---|---|---|
| 2020/0311602 A1 | 10/2020 | Hawley et al. | |
| 2020/0312155 A1 | 10/2020 | Kelkar et al. | |
| 2020/0327009 A1 | 10/2020 | Callison et al. | |
| 2020/0327369 A1 | 10/2020 | Cruz et al. | |
| 2020/0342230 A1 | 10/2020 | Tsai et al. | |
| 2020/0342235 A1 | 10/2020 | Tsai et al. | |
| 2020/0342274 A1 | 10/2020 | ElHattab et al. | |
| 2020/0342506 A1 | 10/2020 | Levy et al. | |
| 2020/0342611 A1 | 10/2020 | ElHattab et al. | |
| 2020/0344301 A1 | 10/2020 | ElHattab et al. | |
| 2020/0371773 A1 | 11/2020 | Kato et al. | |
| 2020/0380806 A1 | 12/2020 | Tabata | |
| 2020/0389415 A1 | 12/2020 | Zhao et al. | |
| 2021/0006950 A1 | 1/2021 | Hajimiri et al. | |
| 2021/0097315 A1 | 4/2021 | Carruthers et al. | |
| 2021/0253122 A1* | 8/2021 | Caprasecca | B60W 50/14 |
| 2021/0364319 A1 | 11/2021 | Abramson | |
| 2021/0397908 A1 | 12/2021 | ElHattab et al. | |
| 2022/0165073 A1 | 5/2022 | Shikii et al. | |
| 2022/0172616 A1 | 6/2022 | Xu et al. | |
| 2022/0185315 A1 | 6/2022 | Falk et al. | |
| 2022/0277349 A1* | 9/2022 | Wasserman | G08G 1/0129 |
| 2022/0289203 A1 | 9/2022 | Makilya et al. | |
| 2022/0290995 A1 | 9/2022 | Zhang | |
| 2022/0307841 A1 | 9/2022 | Zhang | |
| 2022/0374737 A1 | 11/2022 | Dhara et al. | |
| 2023/0077207 A1 | 3/2023 | Hassan et al. | |
| 2023/0094217 A1* | 3/2023 | Gallagher | H04W 4/46 701/1 |
| 2023/0153735 A1 | 5/2023 | Dhara et al. | |
| 2023/0169420 A1 | 6/2023 | Dhara et al. | |
| 2023/0177955 A1 | 6/2023 | Stenneth et al. | |
| 2023/0219592 A1 | 7/2023 | Calmer et al. | |
| 2023/0281553 A1 | 9/2023 | Singh et al. | |
| 2023/0298410 A1 | 9/2023 | Calmer et al. | |
| 2024/0003749 A1 | 1/2024 | Lin et al. | |
| 2024/0005678 A1 | 1/2024 | Hassan et al. | |
| 2024/0013423 A1 | 1/2024 | Zaheer et al. | |
| 2024/0063596 A1 | 2/2024 | Pandian et al. | |
| 2024/0101142 A1* | 3/2024 | Kawano | B60W 40/105 |
| 2024/0146629 A1 | 5/2024 | Lloyd | |

FOREIGN PATENT DOCUMENTS

| | | |
|---|---|---|
| DE | 10 2004 015 221 A1 | 10/2005 |
| DE | 11 2020 002 764 T5 | 4/2022 |
| DE | 11 2022 000 380 T5 | 11/2023 |
| EP | 1615178 A2 | 1/2006 |
| FR | 3123719 A1 | 12/2022 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2022/149049 A2 | 7/2022 |
| WO | WO 2023/244513 A1 | 12/2023 |

OTHER PUBLICATIONS

"Cargo Monitor", Samsara Inc., accessed Feb. 21, 2024 [publication date unknown], in 2 pages. URL: https://www.samsara.com/products/models/cargo-monitor.
"Connect your operations on the Samsara Platform.", Samsara Inc., [publication date unknown]. URL: https://www.samsara.com/products/platform/?gad_source=1&gclid= EAlalQobChMI14DWIofYgwMVaymtBh36cwx9EAAYASAAEgKjUfD_ BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.
"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.
"Guide: DRIVE risk score 101", Motive Technologies, Inc., [publication date unknown], Document No. 2022Q2_849898994 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 22 pages.
"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.
"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 4 pages.
"Map and Tile Coordinates", Google for Developers, last updated Oct. 23, 2023 [retrieved on Oct. 24, 2023], in 5 pages. URL: https://developers.google.com/maps/documentation/javascript/coordinates.
"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.
"Product Brief: System Overview", Motive Technologies, Inc., [publication date unknown], Document No. 2022Q4_ 1203118185166511 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.
"Product Brief: System Overview", Motive Technologies, Inc., [publication date unknown], Document No. 2022Q4_ 1203118185166511 (referenced in Jan. 24, 2024 Complaint, Case

(56) References Cited

OTHER PUBLICATIONS

No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https:/keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.

"Spec Sheet: Smart Dashcam", Motive Technologies, Inc., [publication date unknown], Document No. 2022Q2_911703417 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 4 pages.

"Spec Sheet: Vehicle Gateway", Motive Technologies, Inc., [publication date unknown], Document No. 2022Q1_858791278 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"Vehicle Gateway", Samsara Inc., [publication date unknown]. URL: https://www.samsara.com/products/models/vehicle-gateway (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.

"Transform your business with the Connected Operations™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 1 page.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Green, A., "Logistics Disruptors: Motive's Shoaib Makani on AI and automation", Mckinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from, the%20driver%20a%20safety%20score (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017 URL: https://gpstrackit.com/blog/a-timeline-of-the-eld-mandate-history-and-important-dates/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.

Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, in the Matter of Certain Vehicle Telematics, Fleet Management, and

(56) References Cited

OTHER PUBLICATIONS

Video-Based Safety Systems, Devices, and Components thereof, Investigation No. 337-TA-3722), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.

Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.

Motive Help Center, "Viewing Close Following Events on the Motive Fleet Dashboard", Motive Technologies, Inc., accessed on Oct. 24, 2023 [publication date unknown], in 7 pages. URL:

(56) References Cited

OTHER PUBLICATIONS https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score.

Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: DRIVE risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WncIRs_cFw0.

Motive, "How to install your Motive AI Dashcam." [video], YouTube, Aug. 5, 2022, screenshot in 1 page. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

(56) References Cited

OTHER PUBLICATIONS

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 9 pages.

Motive, "KeepTruckin ELD Training for Drivers" [video], YouTube, Feb. 2, 2018, screenshot in 1 page. URL: https://www.youtube.com/watch?v=LkJLIT2bGS0.

Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.

Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Motive Reefer Monitoring for cold chain logistics." [video], YouTube, Oct. 5, 2022, screenshot in 1 page. URL: https://www.youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.

Motive, "No time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_1202933457877590, in 4 pages.

Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 7 pages.

Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.

Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.

Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.

Motive, "Products | Driver Safety—Protect your fleet and profits with an all-in-one safety solution.", Motive Technologies, Inc., accessed on Feb. 5, 2024 [publication date unknown]. URL:https://gomotive.com/products/driver-safety/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 16 pages.

Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 12 pages.

Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.

Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.

Motive, "Spec Sheet: AI Dashcam", Motive Technologies, Inc., accessed on Oct. 24, 2023 [publication date unknown], Document No. 2022Q3_1202788858717595, in 5 pages.

Motive, "Spec Sheet: Asset Gateway", Motive Technologies, Inc., accessed on Mar. 15, 2023 [publication date unknown], Document No. 2022Q1_849551229, in 6 pages.

Motive, "Take control of your fleet with Groups and Features Access.", Motive Technologies, Inc., Apr. 4, 2017, in 3 pages. URL: https://gomotive.com/blog/take-control-fleet-groups-features-access/.

Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.

Motive, "The most accurate AI just got better.", Motive Technologies, Inc., Mar. 8, 2023, in 8 pages. URL: https://gomotive.com/blog/fewer-fleet-accidents-with-the-new-ai/.

Motive, "The Motive Driver App: Change current duty status in your driving log." [video], YouTube, Aug. 10, 2022, screenshot in 1 page. URL: https://www.youtube.com/watch?v=m4HPnM8BLBU.

Motive, "The Motive Driver App: Claim and correct unidentified trips." [video], YouTube, Sep. 13, 2022, screenshot in 1 page. URL: https://www.youtube.com/watch?v=z2_kxd3dRac.

Motive, "The Motive Driver App: Connect to the Vehicle Gateway." [video], YouTube, Sep. 13, 2022, screenshot in 1 page. URL: https://www.youtube.com/watch?v=egZmLYDa3kE.

Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.

Motive, "The Motive Driver App: Digitally record hours of service (HOS)." [video], YouTube, Aug. 10, 2022, screenshot in 1 page. URL: https://www.youtube.com/watch?v=gdexlb_zqtE.

Motive, "The Motive Driver App: Insert past duty driving log status." [video], YouTube, Aug. 10, 2022, screenshot in 1 page. URL: https://www.youtube.com/watch?v=TmOipFKPBeY.

Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.

Motive, "The Motive Driver App: View hours of service (HOS) violations." [video], YouTube, Aug. 10, 2022, screenshot in 1 page. URL: https://www.youtube.com/watch?v=qJX2ZiBGtV8.

Motive, "U.S. speed limits. What drivers and fleets need to know.", Motive Technologies, Inc., Jan. 13, 2022, in 8 pages. URL: https://gomotive.com/blog/us-speed-limits-for-drivers/.

(56) References Cited

OTHER PUBLICATIONS

Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm458564145580163323842957870 4 (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, in the Matter of Certain Vehicle Telematics, Fleet Management, and Video-Based Safety Systems, Devices, and Components thereof, Investigation No. 337-TA-3722), in 8 pages.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"Eco: Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco: Drive system", Fleet World, 2010, in 3 pages. URL: https://fleetworld.co.uk/fiat-launches-fleet-specific-ecodrive-system/.
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-

(56) References Cited

OTHER PUBLICATIONS lytx-drivecamtm-program-adds-newclient-centric-enhancements-evolving-the-gold-standard-video-telematics-program.

"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.

"Making roads safer for everyone, everywhere", Light Metrics, 2023, in 8 pages. URL: https://www.lightmetrics.co/about-us.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Nauto—Getting Started", Manualslib, Nauto, Inc., Apr. 20, 2017, in 18 pages. URL: https://www.manualslib.com/manual/1547723/Nauto-Nauto.html.

"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.

"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.

"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

"NetraDyne, an Artificial Intelligence Leader, Launches Driver-i™, a Vision-Based Platform, Focusing on Commercial Vehicle Driver Safety", Netradyne, [publication date unknown], in 2 pages.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"The 2012 Fiat 500: eco: Drive", Fiat500USA.com, Feb. 14, 2011, in 24 pages. URL: http://www.fiat500usa.com/2011/02/2012-fiat-500-ecodrive.html.

"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

"What is a ter-a-flop?", netradyne.com, [publication date unknown], in 2 pages.

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, April 2, 2019, in 4 pages. URL: https://www.prnewswire.com/news-releases/vezo-360-the-worlds-smartest-dashcam-keeps-you-awake-at-the-wheel-300823457.html.

"The Home of Actionable Transportation Insights—Meet Altitude", Geotab ITS, accessed on Apr. 1, 2024 [publication date unknown], in 5 pages. URL: https://its.geotab.com/altitude/.

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.

Amazon Web Services, "How Nauto Is Using AI & Ml to Build a Data Platform That Makes Driving Safer and Fleets Smarter" [video], YouTube, Apr. 16, 2018, screenshot in 1 page. URL: https://www.youtube.com/watch?v=UtMIrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.

AutoMotoTV, "Fiat ecoDrive System" [video], YouTube, Oct. 6, 2008, screenshot in 1 page URL: https://www.youtube.com/watch?v=AUSb2dBBI8E.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.

Bendix, "Bendix® Wingman ® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf [uploaded in 2 parts].

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

(56) References Cited

OTHER PUBLICATIONS

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.

FiatFranco, ""Ciao!"—Fiat ecoDrive" [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.

Gilman, E. et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Bljr90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Groover, M. P., Automation, Production Systems, and Computer-Integrated Manufacturing, 2015, 4th Edition, Pearson, in 811 pages.

Groover, M. P., *Automation, Production Systems, and Computer-Integrated Manufacturing*, 2016, 4th Edition (Indian Subcontinent Adaptation), Pearson, in 11 pages.

Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.

Han, Z. et al., "Design of Intelligent Road Recognition and Warning System for Vehicles Based on Binocular Vision", IEEE Access, Oct. 2018, vol. 6, pp. 62880-62889.

Haworth, N. et al., "The Relationship between Fuel Economy and Safety Outcomes", Monash University, Accident Research Centre, Dec. 2001, Report No. 188, in 67 pages.

Horsey, J., "Vezo 360 4K 360 dash cam from $149", Geeky Gadgets, Apr. 3, 2019, in 12 pages. URL: https://www.geeky-gadgets.com/vezo-360-4k-360-dash-cam-03-04-2019/.

Huang, K.-Y. et al., "A Novel Machine Vision System for the Inspection of Micro-Spray Nozzle", Sensors, Jun. 2015, vol. 15(7), pp. 15326-15338.

Huff, A., "Lytx DriveCam", CCJDigital, Apr. 4, 2014, in 12 pages. URL: https://www.ccjdigital.com/business/article/14929274/lytx-drivecam.

Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.

Junior, J. F. et al., "Driver behavior profiling: An investigation with different smartphone sensors and machine learning", PLoS One, Apr. 2017, vol. 12(4): e0174959, in 16 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lekach, S., "Driver safety is 'all talk' with this AI real-time road coach", Mashable, Aug. 3, 2018, in 11 pages. URL: https://mashable.com/article/netradyne-driveri-ai-driver-safety.

Lotan, T. et al., "In-Vehicle Data Recorder for Evaluation of Driving Behavior and Safety", Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/TSD_WebsiteGuide.pdf.

Malamas, Elias N. et al. "A survey on industrial vision systems, applications and tools", Image and Vision Computing, Dec. 28, 2002, vol. 21, pp. 171-188.

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Motive, "Guide: AI Model Development", Motive Technologies, Inc., accessed on Mar. 29, 2024 [publication date unknown], Document No. 2022Q1_849898994, in 14 pages.

Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.

Nauto, "How Fleet Managers and Safety Leaders Use Nauto" [video], YouTube, Jan. 25, 2018, screenshot in 1 page. URL: https://www.youtube.com/watch?v=k_iX7a6j2-E.

Nauto, "The New World of Fleet Safety—Event Keynote" [video], YouTube, Jul. 9, 2020, screenshot in 1 page. URL: https://www.youtube.com/watch?v=iMOab9Ow_CY.

Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.

Netradyne India, "Netradyne Driveri Covered in BBC Click" [video], YouTube, Jan. 25, 2018, screenshot in 1 page. URL: https://www.youtube.com/watch?v=jhULDLj9iek.

Netradyne presentation, Netradyne, Oct. 2016, in 23 pages.

Netradyne, "Driver•i™ Catches No Stop ad Stop Sign | Fleet Management Technology" [video], YouTube, Oct. 3, 2017, screenshot in 1 page. URL: https://www.youtube.com/watch?v=I8sX3X02aJo.

Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.

Netradyne, Driver Card 1, 2018, in 2 pages (ND_ITC_0001-ND_ITC_0002).

Netradyne, Driver Card 2, 2018, in 2 pages (ND_ITC_0003-ND_ITC_0004).

Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

(56) References Cited

OTHER PUBLICATIONS

Ohidan, A., "Fiat and AKQA Launch Eco:Drive ™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B-Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages. [uploaded in 3 parts].
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=1eclwRCb5ZA.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Soumik Ukil, "LightMetrics ADAS demo" [video], YouTube, Jul. 20, 2017, screenshot in 1 page. URL: https://www.youtube.com/watch?app=desktop&v=9LGz1oo7dTw.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage ", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I ™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 Biggest Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozS0E.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group - Improved driver behavior contributes to a 3+% MPG improvement in less than 12 months", FuelOpps by Propel IT, [publication date unknown], in 2 pages.
"FuelOpps™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page. (PROPEL-IT-1393_00019).

\* cited by examiner

Speeding

Define the thresholds for speeding over the posted speed limit. All driving time over the severity level accumulates as time spent over limit within Speeding Reports. Time spent over speeding will continue to affect driver safety scores. Use Duration to define the threshold for when to count speeding as an individual event.

Learn More

Posted Speed Limit

Severity Levels ⓘ   ◉ mph  ○ % ⓘ

| | OverLimit | Duration ⓘ |
|---|---|---|
| Light | 15+ mph ▸ | 300 seconds ▸ |
| Moderate | 20+ mph ▸ | 300 seconds ▸ |
| Heavy | 25+ mph ▸ | 300 seconds ▸ |
| Severe | 35+ mph ▸ | 300 seconds ▸ |

◉ Max Speed
Set a maximum speed limit for your organization. Max speed events will be available in coaching sessions.

Speed Threshold [ 15 ] mph   Duration: [ 60 ▸ ] seconds

○ Rolling Stop Detection (Available in vehicles with compatible dash cams)

FIG. 3A

| Trips ▼ | % Speeding | Light | Moderate | Heavy | Severe |
|---|---|---|---|---|---|
| Ⓑ 3819-3821 North Southport Avenue, Chicago, IL, 60613<br>Jun 19, 7:41 PM PDT (4m 57s)<br>Ⓐ 1742-1756 West Wilson Avenue, Chicago, IL, 60625<br>Jun 19, 7:36 PM PDT | 23.6%<br>0 events<br>1m 10s | 14.5%<br>0 events<br>43s | 9.1%<br>0 events<br>26s | 0.0%<br>0 events<br>0s | 0.0%<br>0 events<br>0s |
| Ⓑ 1759 West Wilson Avenue, Chicago, IL, 60625<br>Jun 19, 5:17 PM PDT (34m 29s)<br>Ⓐ West Hennepin "O" (Crescent) Road, , Chicago, IL, 60646<br>Jun 19, 4:43 PM PDT | 0.8%<br>0 events<br>17s | 0.5%<br>0 events<br>11s | 0.3%<br>0 events<br>5s | 0.0%<br>0 events<br>0s | 0.0%<br>0 events<br>0s |
| Ⓑ 2220 West Giddings Street, Chicago, IL, 60625<br>Jun 13, 8:51 AM PDT (24m 56s) | 2.0%<br>0 events | 1.6%<br>0 events | 0.4%<br>0 events | 0.0%<br>0 events | 0.0%<br>0 events |

FIG. 3D

Safety Settings ☆

Safety Score    Harsh Events    Event Detection    Coaching

Safety Score Configurarion

Set relative importance of safety scores and weights of safety infractions

[Configure Scores]

Safety Score Target

Set a target safety score for your entire fleet to show on your safety score graphs Target Score

Safety Settings ☆

Safety Score     Harsh Events     Event Detection     Coaching

Automatically Add to Coaching

When an event is triggered, it will be automatically placed in a Needs Coaching status and added to a driver's coaching queue.

Needs Coaching

[ CRASH RECOMMENDED ✕ ] [ FOLLOWING DISTANCE RECOMMENDED ✕ ]
[ FOLLOWING OF 2-4S RECOMMENDED ✕ ] [ LATE RESPONSE RECOMMENDED ✕ ]
[ INATTENTIVE DRIVING ✕ ] [ ROLLING STOP RECOMMENDED ✕ ] [ EATING/DRINKING ✕ ]
[ MOBILE USAGE ✕ ] [ NO SEATBELT ✕ ] [ MAX SPEED ✕ ] ( +ADD )

Coach Assignment

Coaches will be automatically assigned to any safety event triggered by their assigned drivers.

2 of 2 drivers with coaches assigned

[ Edit assignments ]

Assigned Coach Email Notifications

When a coach is assigned to a harsh event, an email notification will be sent alerting them to review the event.

Voice Coaching (Available in vehicles with compatible dash cams)
Enabling voice will play messages for harsh events, speeding, and unbuckled seat belts.

Coaching Language

[Default (English) ▾]

Driving Events To Coach

☑ Crash
☑ In-Cab Speeding
  ⦿ Alert if vehicle speed is over posted speed limit by [0] mph
  ○ Alert if vehicle speed is over posted speed limit by [0] %
  Time spent over speed limit before alert [60] sec
☐ Maximum Speed
☑ Seat Belt Unbuckled
☑ Harsh Driving (Acceleration and Brake)

Coaching Due Date
Set the allowable number of days between a safety event occurring and coaching. Events coached after the due date will be considered late.

FIG. 3J

VEHICLE SPEED MANAGEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

Embodiments of the present disclosure relate to devices, systems, and methods that safely navigate a vehicle.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Vehicle speed has an impact on vehicle safety. However, the severity of speeding events may depend in part on individual characteristics of the driver, the vehicle, and objects being transferred by the vehicle. Therefore, it would be advantageous to be able to customize speeding severity so as to be more relevant to a given driver, vehicle, and/or transported object.

SUMMARY

The systems, methods, and devices described herein each have several aspects, no single one of which is solely responsible for its desirable attributes. Without limiting the scope of this disclosure, several non-limiting features will now be described briefly.

An improved system and method of selectively setting speeding designations (e.g., indicating the severity of speeding) for different speeds for vehicles are described. The speeding designations may be configured to ensure the safe traversal of routes by vehicles. The speeding designations may optionally be utilized in generating speeding alerts, generate safety scores, and/or in selecting driver training to further enhance vehicle navigational safety.

An aspect of the present disclosure relates to a system comprising: one or more a computer readable storage mediums having program instructions embodied therewith; and one or more processors configured to execute the program instructions to cause the system to: provide an interface enabling a plurality of speeding severity levels to be defined, wherein a definition comprises for a given speeding severity level, a delta speed difference or percentage speed difference relative to a reference speed limit, and a corresponding time duration; receive, via the interface, definitions for a plurality of speeding severity levels comprising respective delta speed differences or respective percentage speed difference relative to the reference speed limit, and respective corresponding time durations; receive over a network, from a vehicle device, speed data and associated time data for a plurality moments in time, while a vehicle is traversing a route; determine, based at least on the speed data and associated time data for the plurality moments in time a corresponding speeding severity level; determine, based at least in part on the determined corresponding speeding severity level whether the vehicle device is to provide a corresponding driver alert; and at least partly in response to a determination, based at least in part on the determined corresponding speeding severity level that a driver alert is to be provided via the vehicle device, transmit a communication over the network to the vehicle device configured to cause the vehicle device to provide a corresponding in-vehicle driver alert.

An aspect of the present disclosure relates to method performed by an event analysis system having one or more hardware computer processors and one or more non-transitory computer readable storage devices storing software instructions executable by the computing system, the method comprising: providing an interface enabling a plurality of speeding severity levels to be defined, wherein a definition comprises for a given speeding severity level, a delta speed difference or percentage speed difference relative to a reference speed limit, and a corresponding time duration; receiving, via the interface, definitions for a plurality of speeding severity levels comprising respective delta speed differences or respective percentage speed difference relative to the reference speed limit, and respective corresponding time durations; receiving over a wireless network from a vehicle device, speed data and associated time data for a plurality moments in time, while a vehicle is traversing a route; determining, based at least on the speed data and associated time data for the plurality moments in time a corresponding speeding severity level; determining, based at least in part on the determined corresponding speeding severity level whether the vehicle device is to provide a corresponding driver alert; and at least partly in response to determining, based at least in part on the determined corresponding speeding severity level that a driver alert is to be provided via the vehicle device, transmitting a communication over the wireless network to the vehicle device configured to cause the vehicle device to provide a corresponding in-vehicle driver alert.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 3A-3J illustrate example user interfaces.

DETAILED DESCRIPTION

Figure 1A:
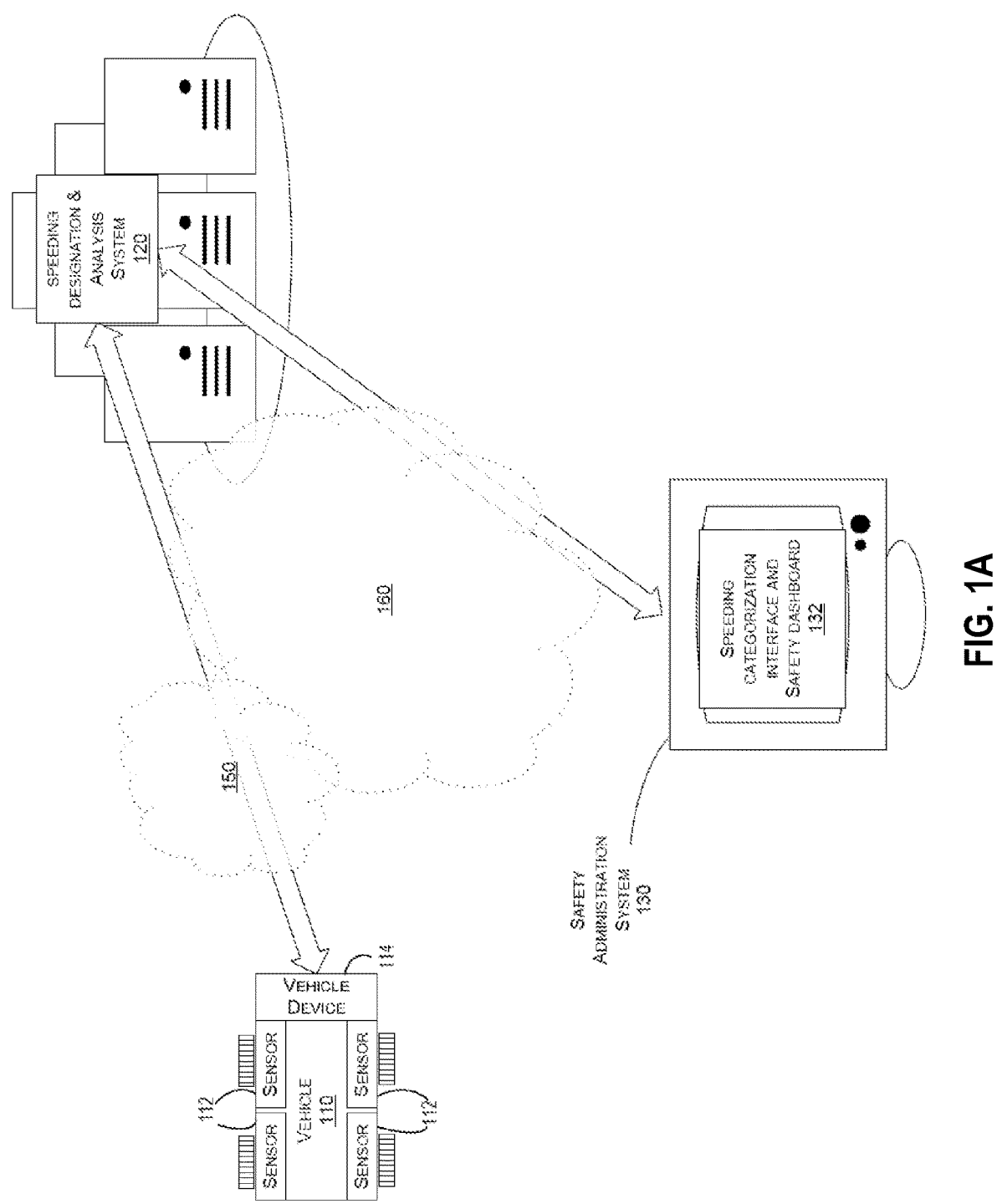
FIG. 1A illustrates a block diagram of an example architecture of a networked vehicle device, analysis system, and safety administration system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular examples described herein. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As discussed herein, an improved system and method of selectively setting speeding designations for vehicles traversing routes are described. The speeding designations may be configured to ensure the safe traversal of routes by autonomous vehicles and/or human driven vehicles. The speeding designations may optionally be utilized to select driver training to further enhance vehicle navigational safety.

Such speeding designations may optionally be generated using one or more learning engines and may adaptively be set based on certain real time data, predicted data, historical data, time data, other data disclosed herein, and/or the like.

Certain data used in setting a speeding designation may be received from sensors. The sensors may be distributed sensors that may traverse a given route. For example, the sensors may be mounted to a vehicle traversing some or all of the given route. By way of illustration, certain sensors may indicate the vehicle speed, the frequency of braking, the initial vehicle speed upon assertion of braking, the terminal speed upon release of the brakes, the time from assertion of braking to release of brakes, the deceleration upon application of the brakes, the acceleration upon release of brakes, occurrence of vertical perturbations of the vehicle, upward acceleration upon detection of a vertical perturbation, amount of vertical height change detected as a result of vertical perturbation and/or the like.

The vehicle sensors may include optical sensors (e.g., video and/or still cameras), accelerometers, microphones, millimeter wave radar sensors, light detection and ranging (Lidar) laser-based sensors, temperature sensors, light intensity sensors, rain sensors, dust sensors, and/or the like. Such sensors may be used to detect other vehicles, obstacles on a road, off-road objects, environmental conditions, and/or the like.

Certain sensors may be embedded in a roadway that forms at least a portion of the given route. Certain sensors may be positioned above or on a side of a roadway that forms at least a portion of the given route, positioned to sense roadway conditions and/or activity. Such sensors may be collectively referred to as roadway sensors.

Certain environmental sensors may be configured to detect environmental conditions for a given roadway, such as light intensity, rain, fog, dust, salt, temperature, ice, snow, and/or the like. Such environmental sensors may detect environmental conditions that may impact traffic flow, such as environmental conditions that may affect visibility and/or tire traction.

A real time clock may be utilized to determine that date and/or time of day at a given instant time for at least a portion of the given route.

The roadway embedded sensors, side positioned road sensors, sensors positioned above the roadway, environmental sensor data, and real time clock data may be coupled to or accessed by a backend server via one or more wired and/or wireless networks for processing and analysis.

Such vehicle sensor data, roadway sensor data, environmental sensor data, and real time clock data may be used, in conjunction with customized speed limit and/or speed designation data to determine speed limits, speeding categorizations and/or safety scores.

A backend (or "cloud") server may have context and perspective that individual vehicle devices do not have with respect to identifying harsh events, such as speeding occurrences, speeding categorizations, safety evaluations, and/or identifying appropriate training. For example, the backend server may include data associated with a large quantity of vehicles, such as vehicles across a fleet or within a geographic area. Further, the backend server may access historical data and environmental data that is unavailable to an individual vehicle. Thus, the backend server may perform analysis of data assets across multiple vehicles and drivers, as well between groups of vehicles (e.g., comparison of fleets operated by different entities) and drivers, optionally using environmental data, historical data, and/or time data. The backend server can use uploaded data assets to optimize for both customer experience and data transfer quantity. For example, using non-speeding data associated with a speeding event, the backend server can make an informed go/no-go decision on whether a particular event should be shown in a safety dashboard. The backend server may also make a determination as to how a speeding event is to be categorized and/or reported. The backend server may then decide whether data assets associated with the safety event should be transmitted from the vehicle device to the backend, for example only if the detected event is a positive event or an event meeting certain criteria. Thus, the amount of data transmitted to the backend server may be largely reduced, while maintaining the ability for the backend server to obtain as much data as needed to apply alert criteria and transmit corresponding alerts. An event analysis system may also include a feedback system that periodically updates event models used by vehicle devices to provide immediate in-vehicle alerts, such as when the backend server has optimized an event model based on analysis of data assets associated with many safety events, potentially across multiple fleets of vehicles.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Device: an electronic device that includes one or more sensors positioned on or in a vehicle. A vehicle device may include sensors such as one or more video sensors, audio sensors, accelerometers, global positioning systems (GPS), and the like. Vehicle devices include communication circuitry configured to transmit event data to a backend (or "cloud" server). Vehicle devices also include memory for storing software code that is usable to execute one or more event detection models that allow the vehicle device to trigger events without communication with the backend. A vehicle device may also store data supplied from the backend, such as map data, speed limit data, speeding categorization specifications, alerts, traffic rules data, and the like. Such data may be used at the vehicle device to determine if triggering criteria for an event have been matched.

Events of interest (or "event") are, generally, circumstances of interest, such as safety events, to a safety advisor, fleet administrator, vehicle driver, or others. Events may be identified based on various combinations of characteristics associated with one or more vehicles. For example, a safety event associated with a vehicle may occur when the vehicle is moving at a speed that is more than 20 mph above the speed limit.

Safety Event: an event that indicates an accident involving a vehicle, such as a crash of the vehicle into another vehicle or structure, or an event that indicates an increased likelihood of a crash of vehicle.

Driver Assistance Event: one type of safety event that does not necessarily indicate a crash, or imminent crash, but indicates that the driver should take some action to reduce likelihood of a crash. For example, driver assistance events may include safety events indicating that a vehicle is tailgating another vehicle, the vehicle is at risk of a forward collision, or the driver of the vehicle appears distracted.

Harsh Event: one type of safety event indicating an extreme action of a driver and/or status of a vehicle. Harsh events may include, for example, detecting that a driver has accelerated quickly, has braked extensively, has made a sharp turn, is speeding, or that the vehicle has crashed.

Event Model (or "triggering criteria"): a set of criteria that may be applied to data assets to determine when an event has occurred. An event model may be a statistical model taking as input one or more types of vehicle data. An event model may be stored in any other format, such as a list of criteria, rules, thresholds, and the like, that indicate occurrence of an event. An event model may additionally, or alternatively, include one or more neural networks or other artificial intelligence.

Event Data: data associated with an event. Event data may include data assets (e.g., photographs, video files, etc.) associated with a detected safety event. Event data may include data assets that were used by an event model to trigger a safety event. Event data may also include metadata regarding a detected event.

Sensor Data: any data obtained by the vehicle device, such as asset data and metadata.

Asset Data: any data associated with a vehicle, such as data that is usable by an event model to indicate whether a safety event has occurred. Data assets may include video files, still images, audio data, and/or other data files. In some implementations, asset data includes certain metadata, as defined below. Data assets may include:

Video files, which may be uploaded for each camera and may be controllable individually. Video files that are uploaded to the backend may be set to a default length (e.g., 3 seconds before and 3 seconds after the detected safety event) and/or may be selected based on rules associated with the detected event. Video transcoding may be customized, at the vehicle device and/or by the backend, to adjust the bit rate, frame rate, resolution, etc. of video files that are transmitted to the backend.

Still Images from each camera, e.g., single frames of a video file, may be transmitted to the backend either as part of initial event data transmitted to the backend after detecting a safety event and/or in response to a request for still images from the backend. In situations where the backend requests still images from a vehicle device, the backend may determine image settings (e.g., image quality, down sampling rate, file size, etc.), as well as timeframe from which images are requested (e.g., one image every 0.2 seconds for the five section time period preceding the detected event).

Audio data can be combined with video, or sent separately and transcoded into video files after the fact. The backend may determine audio transcoding parameters for requested audio data.

Metadata: data that provides information regarding a detected event, typically in a more condensed manner than the related data assets. Metadata may include, for example, accelerometer data, global positioning system (GPS) data, ECU data, vehicle data (e.g., vehicle speed, acceleration data, braking data, etc.), forward camera object tracking data, driver facing camera data, hand tracking data and/or any other related data. For example, metadata regarding a triggered event may include a location of an object that triggered the event, such as a vehicle in which a FCW or Tailgating safety event has triggered, or position of a driver's head when a distracted driver event has triggered. Metadata may also include calculated data associated with a detected safety event, such as severity of the event, which may be based on rules related to duration of an event, distance to a leading vehicle, or other event data. Metadata may include information about other vehicles within the scene in the case of tailgating or FCW event, as well as confidence levels for these detections. Metadata may include confidence and headpose for a driver in the case of a distracted driver event. Metadata may also include information such as event keys and other identification information, event type, event date and time stamps, event location, and the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, extendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Speeding Designation and Analysis System

FIG. 1A illustrates a speeding designation and analysis system 120 in communication with a vehicle device 114 and a safety administration system 130. In this embodiment, the vehicle 110 includes a vehicle device 114, which may physically incorporate and/or be coupled to (e.g., via wired or wireless communication channel) a plurality of sensors 112. The sensors 112 may include, for example, a forward facing camera and a driver facing camera. The cameras may be used, by way of example, to capture safety-related images, such as still images or video images of the road and/or of the driver. Such images may be analyzed by the vehicle device 114 and/or the speeding designation and analysis system 120 to detect safety events (e.g., that the driver is drowsy as determined from images of the driver that indicates drooping eyelids or nodding head, as determined from lane drift of the vehicle, as determined from steering patterns, or otherwise), that the road has potholes or speed bumps, and/or the like).

The vehicle device 114 further includes one or more microprocessors in the communication circuit configured to transmit data to the speeding designation and analysis system 120, such as via one or more of the networks 150, 160. In this example, a speeding categorization interface and a safety dashboard 132 may be generated on a safety administration system 130 to enable customized speeding designations to be specified and to illustrate event data, including speeding data, from the speeding designation and analysis system 120, such as via an online portal (e.g., a website or standalone application). The safety administration system 130 may be operated, for example, by a safety officer that reviews information regarding triggered safety events associated with a fleet of drivers/vehicles.

The speeding designation and analysis system 120 may optionally include or access an artificial intelligence component comprising one or more learning engines. The artificial intelligence component may adaptively set the speeds for different speeding severity levels (e.g., using an application programming interface or otherwise) using certain real time data, predicted data, historical data, time data, other data disclosed herein, and/or the like. Such data may indicate various risk factors, such as environment conditions along a given route being driven by a vehicle (e.g., temperature, rain conditions, snow conditions, fog conditions, sand storm conditions, sun glare conditions, visibility, etc.), roadway conditions (e.g., the presence or speed bumps, potholes, ice, snow, etc.), vehicle data (e.g., vehicle type data (e.g., sedan, SUV, pickup truck, bus, panel van, 18 wheeler big rig, armored vehicle, etc.), vehicle weight data, vehicle braking ability, and/or data identifying the type(s) of objects being transported), and/or driver data (e.g., driver safety score, driver driving experience, and/or the like). Other data that may be utilized in setting speeding severity levels may include the date, time of day, sunrise time, sunset time, traffic data, and/or the like.

For example, the artificial intelligence component may be configured to predict a likelihood of a harsh event, such as an accident, using some or all of the foregoing data and reduce a speed delta for a given speeding severity level to decrease the likelihood of the harsh event.

Non-limiting examples of machine learning algorithms that can be used to predict harsh events and set of adjust speeding severity level specifications can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms. These machine learning algorithms may include any type of machine learning algorithm including hierarchical clustering algorithms and cluster analysis algorithms, such as a k-means algorithm.

By way of further example, optionally, a learning engine may utilize reinforcement learning, where machine learning models are trained to make a sequence of decisions. The learning engine may learn to achieve a specified goal (e.g., related to reducing the likelihood of a harsh event) in a complex environment. The learning engine may utilize trial and error to generate a solution that will achieve the desired goal. Incentives and disincentives may be utilized, where the learning engine may be rewarded when performing a desired action or may be penalized when performing an undesired action. Thus, the learning engine will attempt to maximize the total reward, resulting in a solution to achieve the specified goal.

By way of further example, a learning engine may be configured as a neural network, such as a deep neural network. The CNN may include an input layer, one or more hidden layers, and an output layer. The neural network may be configured as a feed forward network. The neural network may be configured with a shared-weights architecture and with translation invariance characteristics. The hidden layers may be configured as convolutional layers (comprising neurons/nodes), pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

When configured as an autoencoder, the neural network may be configured to learn efficient data codings in an unsupervised manner. An autoencoder may be utilized to perform harsh event predictions for a given driver, vehicle, and/or route. An autoencoder may attempt, with a reduced dimensionality, to replicate input vectors at the output layer with a reduced set of neurons/nodes.

For example, the autoencoder encoder may generate a vector representation of historical accidents and their correlations using one or more encoding layers. The autoencoder decoder may then generate a representation/prediction of a harsh event, such as an accident, at a future time point using one or more decoding layers. An error function, such as mean absolute error function and/or a weighted mean squared error function, may be used to evaluate the prediction performance of the neural networks and to adjust the neural network weights. For example, a given node edge may be assigned a respective set of weights. Backpropagation may be used to adjust the weights each time the error is calculated to improve the autoencoder performance.

By using machine-learning techniques, large amounts (such as terabytes or petabytes) of received data may be analyzed to set or adjust speeding severity level specifications and to generate alerts and interactive documents without time consuming, error prone, and significantly more limited manual analysis.

Various example computing devices 114, 120, and 130 are shown in FIG. 1A. In general, the computing devices can be any computing device such as a cloud computing system, desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that enables a user to access interactive user interfaces, view images, analyses, or aggregated data, and/or the like as described herein. In various embodiments, users may interact with various components of the example operating environment (e.g., the safety dashboard 130, the speeding designation and analysis system 120, etc.) via various computing devices. Such interactions may be accomplished via interactive graphical user interfaces, however alternatively such interactions may be accomplished via command line, voice input, gestures, and/or other means.

As shown in the example of FIG. 1A, communications between the vehicle device 114 and speeding designation and analysis system 120 may occur via network 150, while communication between the speeding designation and analysis system 120 and safety administration system 130 may occur via network 160. However, networks 150, 160 may include some or all of the same communication protocols, services, hardware, etc. Thus, although the discussion herein may describe communication between the vehicle device 114 and the speeding designation and analysis system 120 via the network 150 (e.g., via cellular data) and communication between the speeding designation and analysis system 120 and the safety administration system 130 via a wired and/or a wireless high-speed data communication network, communications of the devices are not limited in this manner. Optionally, the speeding designation and analysis system 120 and the safety administration system 130 may be integrated into the same system.

Figure 1B:
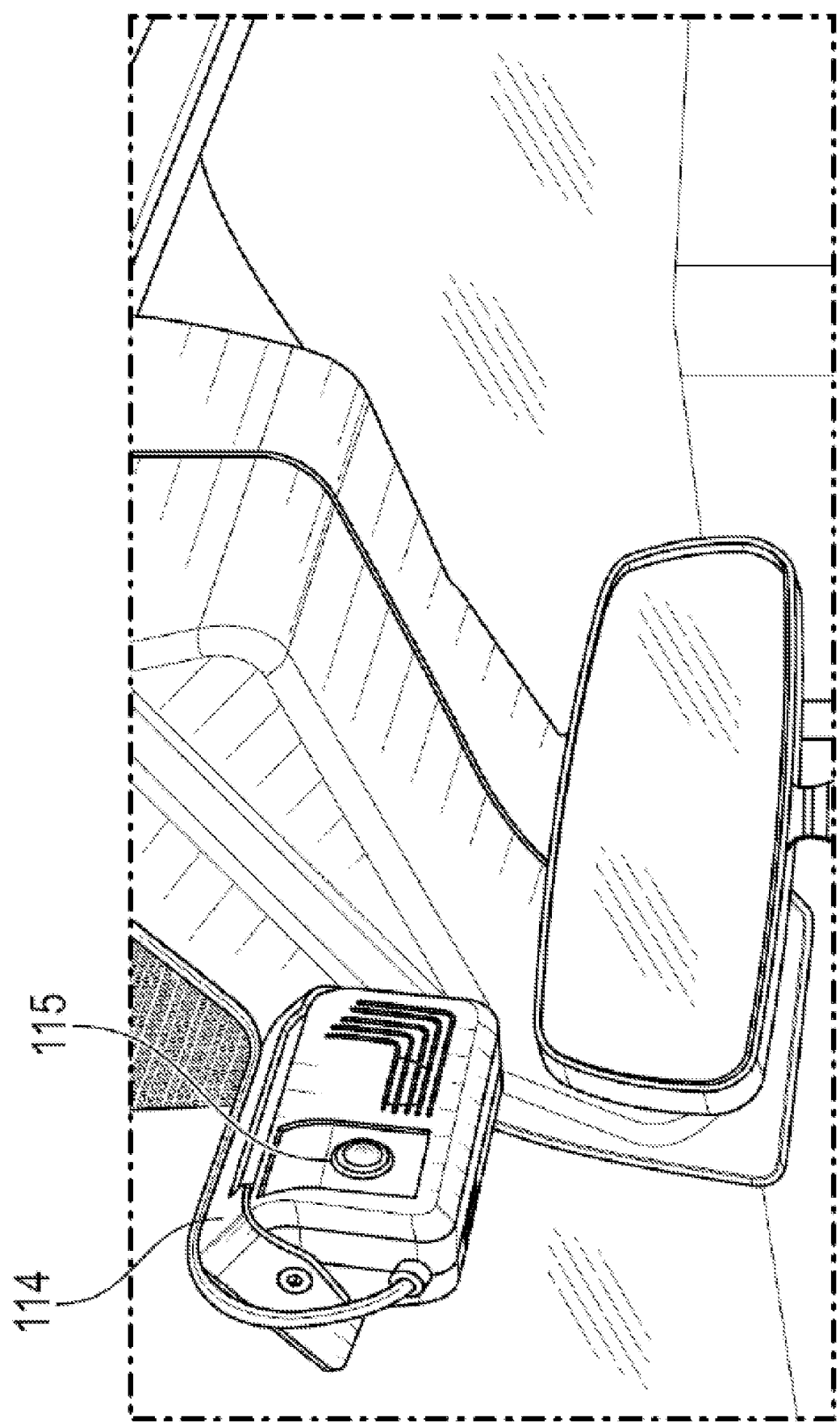
FIG. 1B illustrates an example vehicle device.

FIG. 1B illustrates an example vehicle device 114 mounted inside a vehicle. In this example, the vehicle device 114 includes a driver facing camera 115 and one or more outward facing cameras (not shown). In other embodiments, the vehicle device may include different quantities of video and/or still image cameras. These dual-facing cameras (e.g., the driver facing camera 115 and one or more outward-facing cameras) may be configured to automatically upload and/or analyze footage of safety events and/or may be configured to determine vehicle speed via an internal global navigation system radio, such as a GPS receiver. Furthermore, the event data that is uploaded to the speeding designation and analysis system 120 may be analyzed to detect speeding events, generate alerts, discover driving trends and generate recommendations for improving driver safety. Optionally, one or more of the cameras may be high-definition cameras, such as with HDR and infrared LED for night recording. For example, optionally the outward-facing camera includes HDR to optimize for bright and low light conditions, while the driver-facing camera includes infrared LED optimized for unlit nighttime in-vehicle video.

Vehicle device 114 may include, or may be in communication with, one or more accelerometers, such as accelerometers that measure acceleration (and/or related G forces) in each of multiple axes, such as in an X, Y, and Z axis. The vehicle device 114 may include one or more audio output devices, such as to provide hands-free alerts (e.g., regarding a speeding event, regarding the severity level of a speeding event, regarding other harsh events, regarding navigation directs, and/or other alert subject matter) and/or voice-based coaching. The vehicle device may further include one or more microphones for capturing audio data. The vehicle device includes one or more computer processors, such as high-capacity processors that enable concurrent neural networks for real-time artificial intelligence.

In some embodiments, the vehicle device transmits encrypted data via SSL (e.g., 256-bit, military-grade encryption) to the speeding designation and analysis system 120 via high-speed 4G LTE or other wireless communication technology, such as 5G or the forthcoming 6G communications. The network 150 may include one or more wireless networks, such as a Global System for Mobile Communications (GSM) network, a Code Division Multiple Access (CDMA) network, a Long Term Evolution (LTE) network, or any other type of wireless network. The network 150 can use protocols and components for communicating via the Internet and/or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like.

The network 160 may similarly include any wired network, wireless network, or combination thereof. For example, the network 160 may comprise one or more local area networks, wide area network, wireless local area network, wireless wide area network, the Internet, or any combination thereof.

Example Speed Detection and Alert Process

Figure 2:
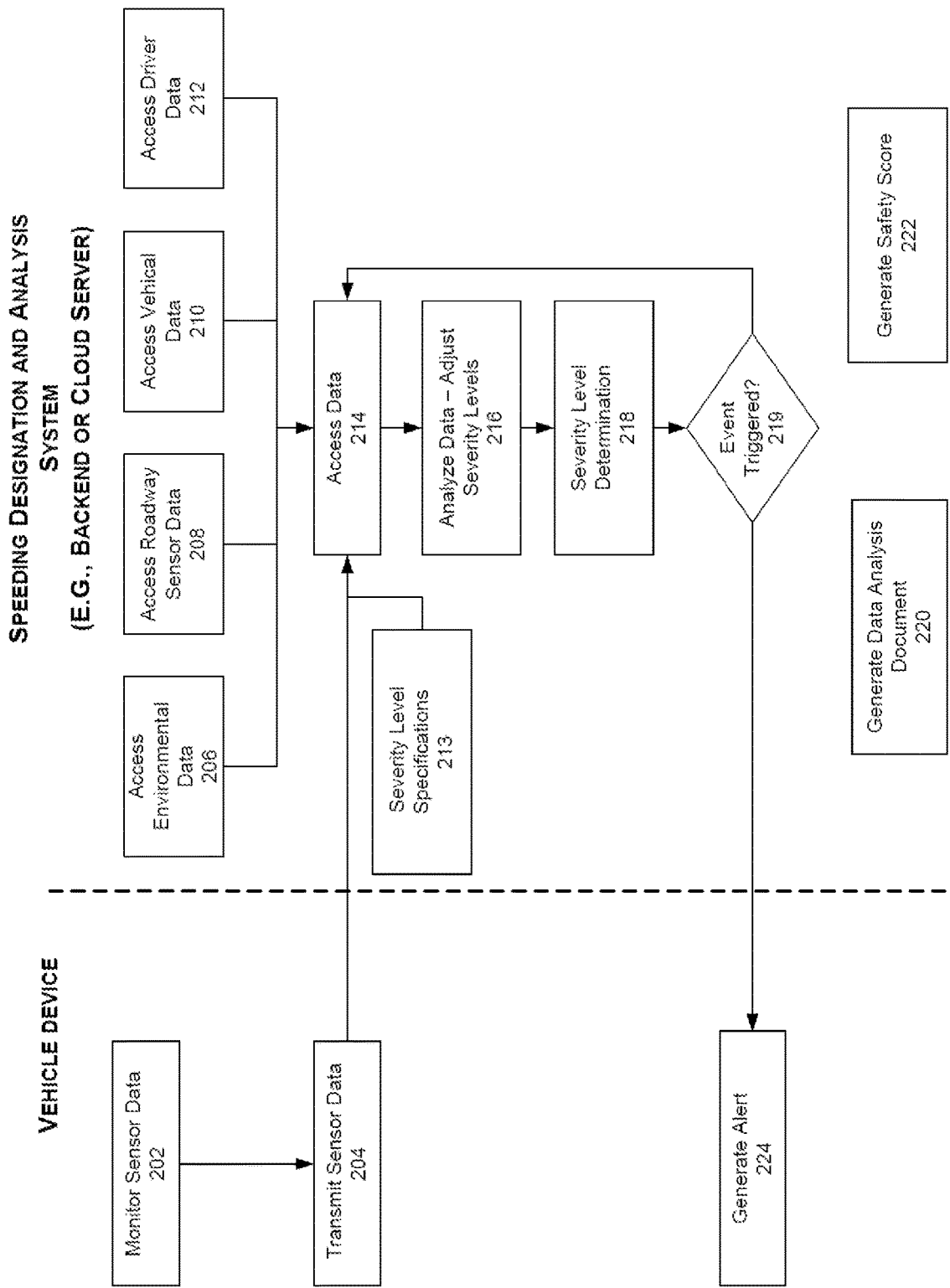
FIG. 2 illustrates an example process.

FIG. 2 illustrates an example process. At block 202, a vehicle device monitors vehicle sensor data. The sensor data may include vehicle speed data. The sensor data may optionally include environmental data, acceleration data in the X, Y, and/or Z axes, camera and other imaging data (e.g., of the driver, of the road, of street signs, etc.), location data, and/or other sensor data discussed herein, and optionally associated timestamps and other metadata. At block 204, the vehicle device transmits some or all of the sensor data and associated metadata to the speeding designation and analysis system (which may be referred to as the analysis system). The sensor data may be transmitted for a plurality moments in time (e.g., every second, every 5 seconds, every 30 seconds, every minute, every 5 minutes, or other time interval, and/or in response to detected events (e.g., the vehicle speed being over a specified threshold)).

At block 214, the analysis system accesses the sensor data from the vehicle device, metadata, and/or other asset data for analysis. Optionally, other data may be analyzed by the analysis system in conjunction with the sensor data from the vehicle device, such as data from other databases, data stores, and/or data feeds. For example, the analysis system may access environmental data 206 corresponding to the vehicle location or route (e.g., temperature, rain conditions, snow conditions, fog conditions, sand storm conditions, sun glare conditions, visibility, etc.), roadway sensor data 208 which may indicate roadway conditions (e.g., the presence or speed bumps, potholes, ice, snow, etc.), vehicle data 210 (e.g., vehicle type data (e.g., sedan, SUV, pickup truck, bus, panel van, 18 wheeler big rig, armored vehicle, etc.), vehicle weight data, vehicle braking ability, and/or data identifying the type(s) of objects being transported), and/or driver data 212 (e.g., driver safety score, driver driving experience, and/or the like). Other accessed data may include the date, time of day, sunrise time, sunset time, traffic data, and/or the like. Such accessed data may reflect on how risky current driving conditions are, how well the driver is expected to safely drive the vehicle given the current driving conditions, the ability of the vehicle to be safely driven given the current driving conditions, and/or the sensitivity of the transported object (e.g., food, toxic waste, human beings, etc.).

In addition, user-specified or default severity levels 213 may be accessed that specify speeding level categorizations for different miles per hour above a reference speed limit, such as the legal/posted speed limit, (a delta speed), or for different percentages above the speed limit. For example, a user may have specified via a user interface, such as that illustrated in FIG. 3A, that the severity level of "light" occurs when a vehicle is driven at least 15 miles per hour over the legal speed limit for at least 300 continuous seconds, the severity level of "moderate" occurs when a vehicle is driven at least 20 miles per hour over the legal speed limit for at least 250 continuous seconds, the severity level of "heavy" occurs when a vehicle is driven at least 25 miles per hour over the legal speed limit for at least 200 continuous seconds, and that the severity level of "severe" occurs when a vehicle is driven at least 35 miles per hour over the legal speed limit for at least 150 continuous seconds. Optionally, the user interface may enable different speed severity levels to be specified for different vehicles, different vehicle types (e.g., sedan, SUV, pickup truck, bus, panel van, 18 wheeler big rig, armored vehicle, etc.), different drivers, different sets of drivers, different times of day, different times of year, different lighting conditions (e.g., dawn, sunrise, daylight, sunset, dusk, nighttime), different road segment types (e.g., school zone road segments, hairpin turns, acute angle turns, onramps, offramps, divided highway, undivided highway, one lane road, city road, incline above a specified angle, decline above a specified angle, and/or the like), different environmental conditions (e.g., rain, snow, ice, fog, and/or the absence thereof), different transported items (e.g., humans, animals, general waste, hazardous waste, time-sensitive medical items, non-sensitive packages, etc.), or any combination thereof. For example, a user may specify via the user interface that two or more conditions need to be met in order for a set of specified speeding severity levels to apply. By way of illustration, a user may specify that a certain set of speeding severity levels is to be utilized for a big rig truck, during nighttime when there is rain. Optionally, the user interface may enable a road map interface to be utilized in assigning sets of speed severity levels to corresponding road segments.

At block 216 the data is analyzed to determine driving risk factors, such as how long it would take the driver to brake the vehicle from various speeds to a stop, the ability of the driver to stop the vehicle a straight line, the distance at which the driver can see potentially hazardous obstacles, the probability that the vehicle will bottom out (hit the bottom of suspension travel, such as when vehicle's springs have compressed fully, causing them to come in contact with the bump stop if it is driven over certain portions of the route, whether the user is drowsy (e.g., as determined from images of the driver that indicates drooping eyelids or nodding head, as determined from lane drift of the vehicle, as determined from steering patterns, as determined from physiological measurements, and/or otherwise), and/or the like.

Optionally, the analysis may cause the previously specified speeding level categorizations to be adjusted in accordance with the analysis. As similarly discussed elsewhere herein, an artificial intelligence component may optionally be utilized to predict the likelihood of a harsh event, such as an accident, and to adjust speeding level categorizations as needed (e.g., to reduce the delta speed relative to a legal speed limit for a given severity level) to cause an alert to be generated to reduce the likelihood of a harsh event. Further, the artificial intelligence component may optionally be configured to adjust speeding level categorizations as needed (e.g., to increase the delta speed relative to a legal speed limit for a given severity level) to reduce the likelihood that an unnecessary alert will be generated.

At block 218, a severity level is determined using vehicle speed data and associated timing data (indicating how long the vehicle has been at respective speeds), and the current speeding severity level specifications for the various severity levels. The current severity level specifications may correspond to the pre-specified severity level specifications of block 213, or if adjusted, the adjusted severity level specifications of block 216. For example, the vehicle speed and vehicle speed time period may be compared against the various speeding severity level specifications, and the worst-case severity level whose specification satisfies the current vehicle speed and time period at the speed may be selected.

At block 219, a determination is made as to whether the determined severity level triggers a speeding alert notification (e.g., using an event model). For example, in order to avoid distracting alerts and network bandwidth utilization when such alerts are unnecessary, an alert may be initiated only for more severe speeding events and not for less severe speeding events (e.g., for heavy and severe speeding and not for light or moderate speeding), and other alerts may optionally be inhibited. Optionally, alerts may be triggered and/or generated for other driver assistance events.

If a determination is made that an alert notification is to be generated, an alert notification command is transmitted to the vehicle device. Optionally, the command may indicate that type of notification and/or the determined speeding severity level. At block 224, the vehicle device may generate the corresponding in-vehicle alert. The alert may optionally be configured to indicate the event that triggered an alert and may optionally indicate the corresponding speeding severity level. For example, the in-vehicle alerts may include various audible signals, visual indicators, and/or haptic indicators (e.g., vibration of the vehicle steering wheel, car seat, and/or the like). Optionally, in addition to or instead of in-vehicle alerts, the speeding designation and analysis system may generate and transmit one or more alerts to one or more other destinations, such as to one or more users (e.g., a safety supervisor). Such an alert may include some or all of the data used in determining that an alert is to be generated to provide additional context to the alert and to further enhance safety. For example, an email or other message may be transmitted to one or more destinations, such as illustrated in FIG. 3I. The messages may be automatically sorted or ranked in response to severity and/or recentness, so that the messages corresponding to the more severe and/or recent harsh events (e.g., speeding events) are presented first.

Figure 3B:
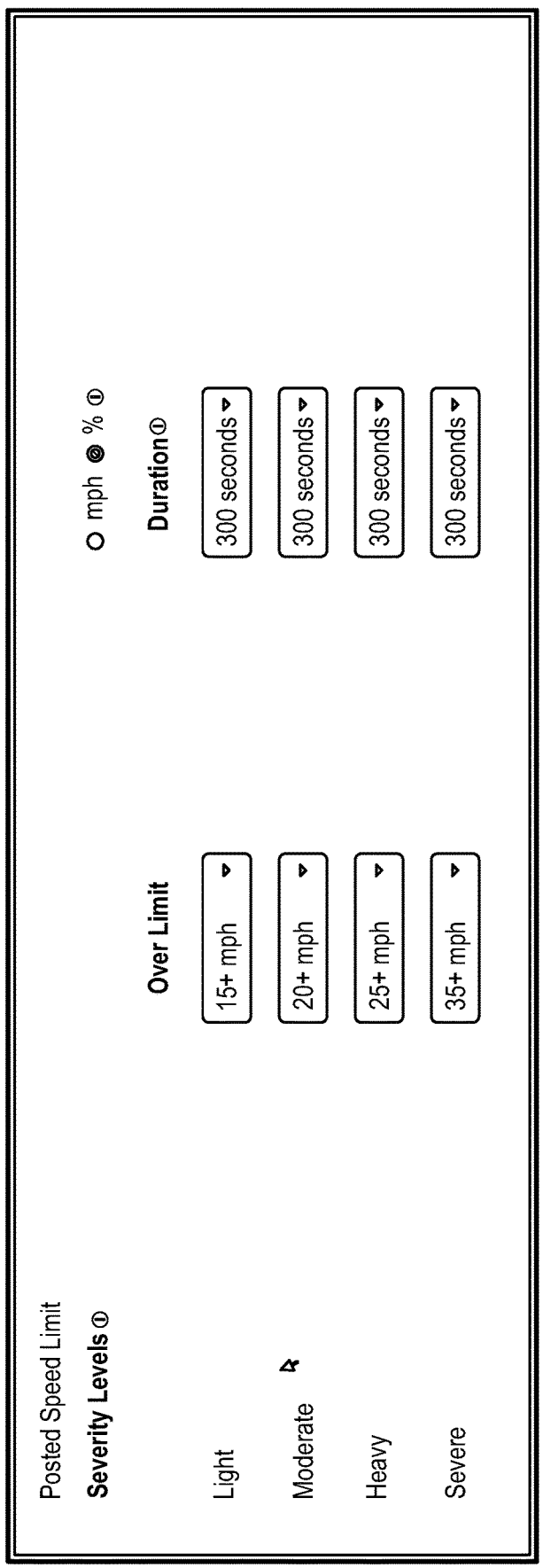
Figure 3C:
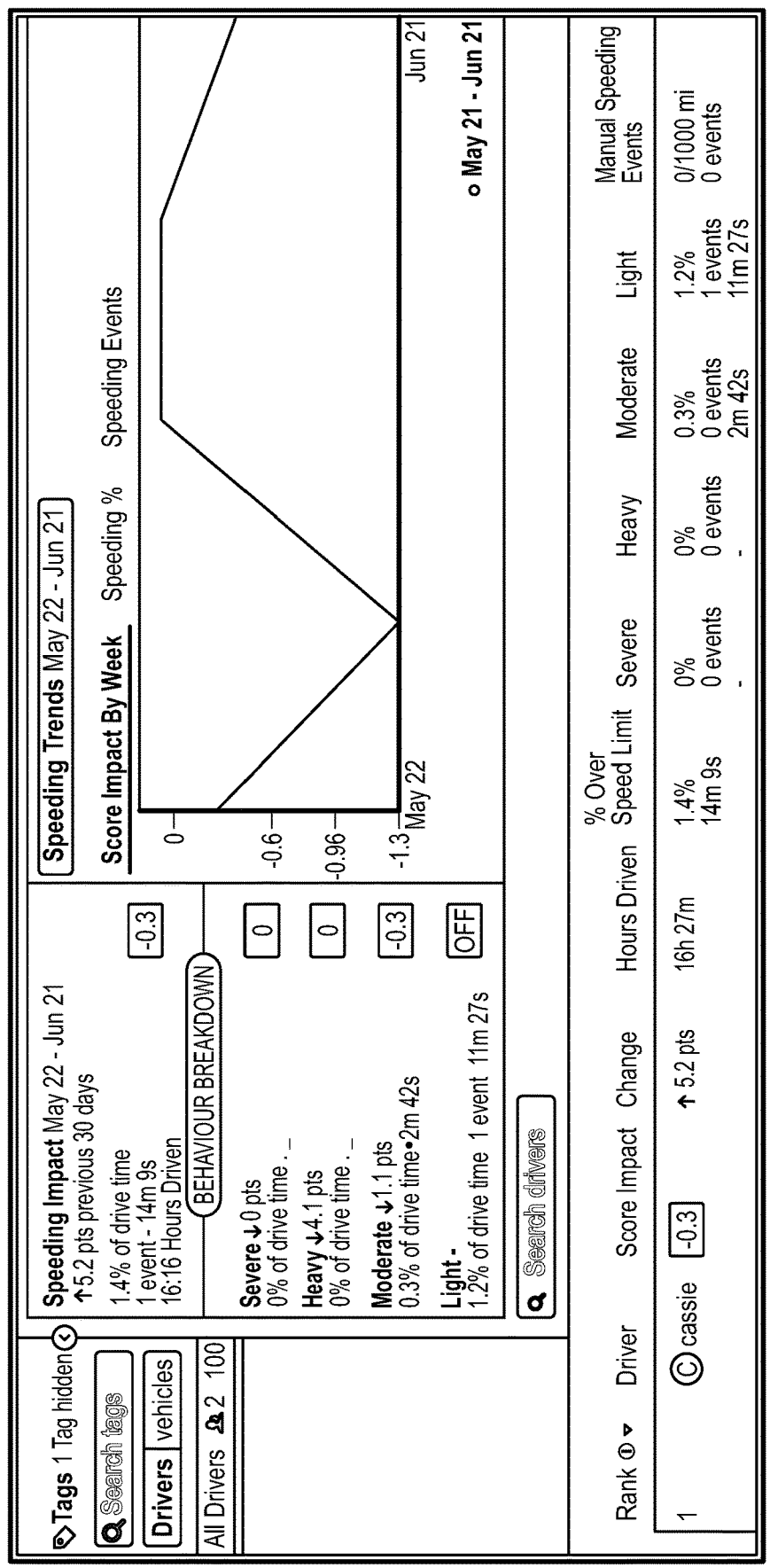
Figure 3E:
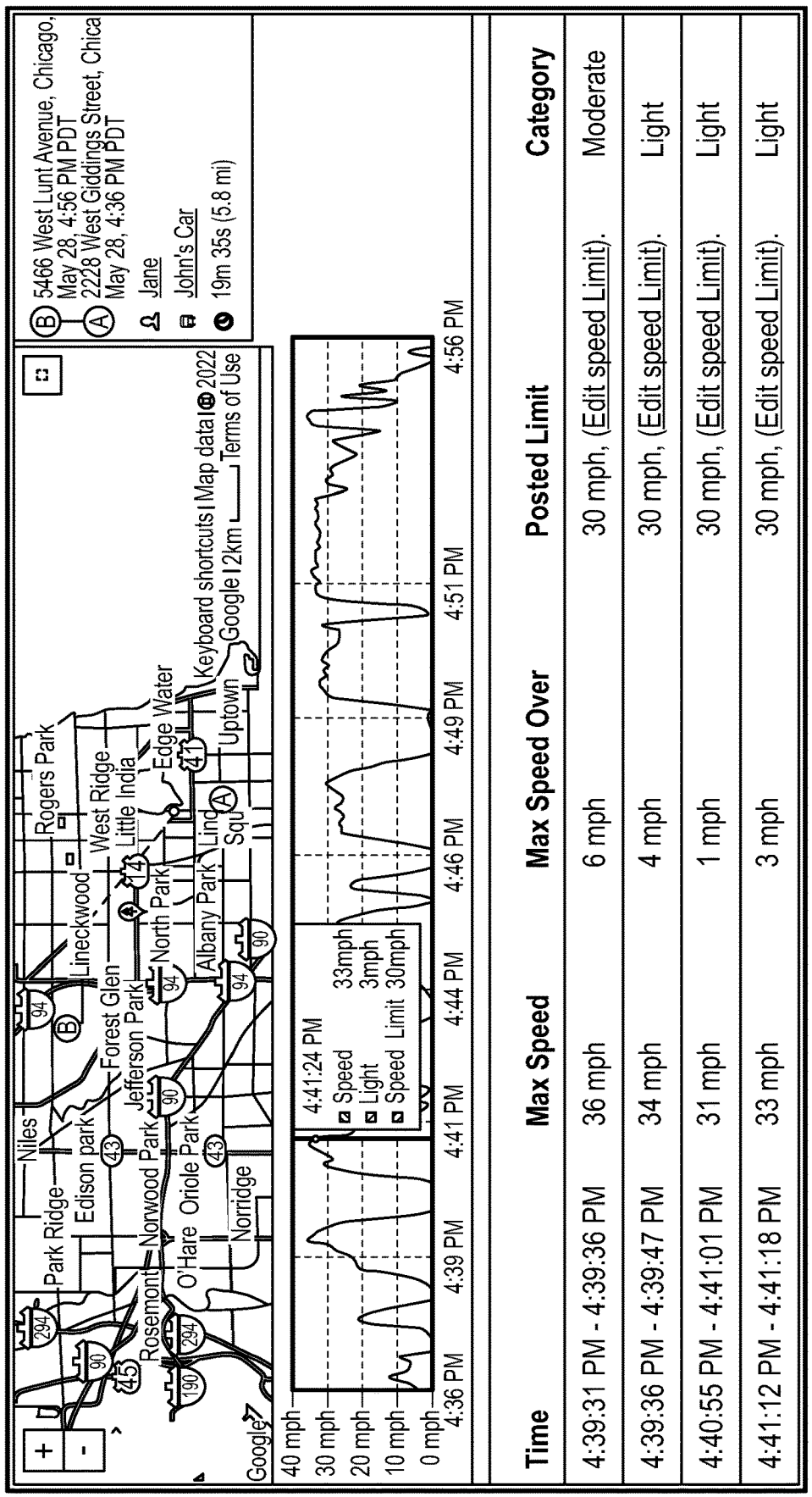

At block 220 a data analysis document may be generated, such as that illustrated in FIG. 3C and/or FIG. 3E. For example, the data analysis document may include a driver safety score for one or more drivers, the speeding impact on the drivers' safety score for a specified period of time, the change (positive or negative) in the safety score over the specified time period in terms of the change in score points and/or in the percentage change in the score, a speeding behavior breakdown that indicates for each severity level, the effect that severity level has on the safety score (e.g., in terms of the number of points and/or in terms of the percentage change), and the percentage of drive time and the amount of drive time that was spent at each severity level (e.g., for a particular driver, a subset of drivers, all drivers, a particular vehicle, a subset of vehicles, and/or all vehicles). The document may include a graph depicting speeding trends for a given period of time. Optionally, the document may be interactive and may include controls via which a user may select among score impact trends, speeding percentage trends, and speeding events trends. Optionally, the document may include a ranking of drivers where the ranking may be based on respective driver scores. For example, the ranking may provide, for a given driver, the driver rank, the driver name, the safety score impact from speeding events, the safety score change (in points), the number of hours driven, the percent of driving time and amount driving time that was over a reference speed limit (e.g., the legal/posted speed limit), the percentage of driving time and amount of driving time spent at each speeding severity category, and the number of speeding events at each severity level. The document and/or some or all of the document data may be stored in a database or other data store.

Optionally, in the event that certain criteria are met with respect to a speeding event a coaching event may be assigned and executed. The coaching event subject matter may be automatically determined based on the speeding event (e.g., the speeding severity level, the number of speeding events, the percentage of driving time that involved a speeding event, and/or the like) and/or other data described herein.

At block 222, a safety score may be generated for the driver. The safety score may be generated or adjusted in response to a user command and/or in response to the detection of a harsh event, such as the occurrence of a speeding event or a speeding event satisfying certain criteria (e.g., corresponding to one or more specified speeding severity levels). The safety score may be generated based on the number of speeding events over a given period of time, the speeding severity levels, the time spent at various speeding severity levels, the percentage of driving time spent at various speeding severity levels. In addition, the safety score may be calculated using other driver history data. Example driver history data can indicate incidents associated with safety, such as incidents that involve an insurance claim, such as for a vehicle accident. Additionally or alternatively, safety can be determined without driver history data. In addition or instead, the safety score may optionally be calculated using predictor metrics or associated with driving a vehicle, such as the time spent coasting, brake events and associated deceleration data, accelerator pedal use, cruise control use, vehicle bottoming-out occurrences, and/or the like.

Example User Interfaces

Example user interfaces will now be described. The user interfaces may be populated using data from one or more data stores, by the vehicle device, by the speeding designation and analysis system, by the safety administration system, and/or other sources. Commands and data provided by a user via the user interfaces may be received, executed and/or processed by the vehicle device, by the speeding designation and analysis system, by the safety administration system, and/or other systems or devices.

FIG. 3A illustrates an example user interface that may be accessed by a user (e.g., via the safety administration system 130) to define different severity levels with respect to speeding events. In particular, the example user interface enables the user to define severity thresholds for speeding over a specified, reference speed limit (e.g., a posted, legal speed limit). For example, controls are provided via which a user may specify how a threshold miles an hour (or kilometers an hour) a vehicle needs to be driven over a corresponding legal speed limit for a defined time duration in order to be assigned a corresponding severity level. A given speeding event may be assigned the highest qualifying severity event. Optionally, the severity levels may be pre-populated with respective threshold speed values.

For example, referring to FIG. 3A, there are 4 different available severity levels: light, moderate, heavy, and severe. Fewer or additional severity levels may be used. Optionally, the user interface may enable the names of the severity levels to be edited. In the illustrated example, the severity level of "light" occurs when a vehicle is driven at least 15 miles per hour over the legal speed limit for at least 300 continuous seconds. In this example, if the vehicle is driven 15 miles over the speed limit for less than 300 continuous seconds, the event would not be classified as speeding. The severity level of "moderate" occurs when a vehicle is driven at least 20 miles per hour over the legal speed limit for at least 300 continuous seconds. The severity level of "heavy" occurs when a vehicle is driven at least 25 miles per hour over the legal speed limit for at least 300 continuous seconds. The severity level of "severe" occurs when a vehicle is driven at least 35 miles per hour over the legal speed limit for at least 300 continuous seconds. As discussed above, a given speeding event may be assigned the highest qualifying severity event. Thus, if a vehicle is driven 40 miles per hour over the legal speed limit for 400 seconds, in this example, the speeding event would be designated as "severe."

Optionally, as illustrated in FIG. 3B, rather than specifying a threshold number of miles an hour over a corresponding legal speed limit, a percentage control provided by the user interface may be selected, which enables a threshold percentage over (optionally or below) the corresponding speed limit to be specified to define a severity level.

Optionally, controls may be provided (not shown) via which a user (e.g., an administrator) can specify types of data and data values that may cause the severity levels to be dynamically adjusted. For example, the user may specify that during dark driving conditions (e.g., as determined by the date/time read from a real time clock and from sunrise/sunset data, as determined from vehicle device light sensors, and/or otherwise), the excess speed for a corresponding speeding category is reduced by 5 miles per hour (or 20%) and the speeding time duration is reduced by 100 seconds (or 25%). Thus, for example, the severity level of "light" may occur when a vehicle is driven at least 10 (instead of 15) miles per hour over the legal speed limit for at least 200 (instead of 300) continuous seconds. Optionally, darkness may be specified as a light intensity (e.g., as measured in lux or candlelight units) that falls below a specified light intensity threshold (e.g., less than 400 lux).

By way of further example, the user may specify via user interface controls that during certain weather conditions and/or certain predicted weather conditions, such as high winds or rain that exceed a corresponding threshold (e.g., as determined from weather data feeds or from vehicle device sensors), the excess speed for a corresponding speeding category is reduced by 10 miles per hour (or 25%) and the speeding time duration is reduced by 150 seconds (or 25%). Thus, for example, when certain weather conditions and/or certain predicted weather conditions are detected, the severity level of "light" may occur when a vehicle is driven at least 5 (instead of 15) miles per hour over the legal speed limit for at least 150 (instead of 300) continuous seconds.

By way of still further example, the user may specify via user interface controls that in the event of certain road conditions and/or certain predicted road conditions, such as potholes, speed bumps, or ice (e.g., as determined from weather data feeds, maps and/or from vehicle device sensors, such as accelerometers, cameras, and/or other sensors disclosed herein), the excess speed for a corresponding speeding category is reduced by 12 miles per hour (or 30%) and the speeding time duration is reduced by 200 seconds (or 30%). Thus, for example, in the event of certain road conditions and/or certain predicted road conditions, the severity level of "light" may occur when a vehicle is driven at least 3 (instead of 15) miles per hour over the legal speed limit for at least 100 (instead of 300) continuous seconds.

In addition, the user interface may include controls that enable different sets of speeding categorizations to be assigned to different drivers, different sets of drivers, different vehicles, different sets of vehicles, and/or to different types of transported items.

For example, the user interface may enable a user to specify different speeding categorizations for sets of drivers having different safety scores. By way of illustration, a user may specify that drivers having a safety score of 90 or better out of 100 may have a severity level of "light" when a vehicle is driven at least 20 miles per hour over the legal speed limit for at least 400 continuous seconds, a severity level of "moderate" when a vehicle is driven at least 25 miles per hour over the legal speed limit for at least 300 continuous seconds, a severity level of "heavy" when a vehicle is driven at least 30 miles per hour over the legal speed limit for at least 250 continuous seconds, and a severity level of "severe" when a vehicle is driven at least 40 miles per hour over the legal speed limit for at least 200 continuous seconds. By contrast, a user may specify that drivers having a safety score of 75 or less out of 100 may have a severity level of "light" when a vehicle is driven at least 10 miles per hour over the legal speed limit for at least 300 continuous seconds, a severity level of "moderate" when a vehicle is driven at least 15 miles per hour over the legal speed limit for at least 250 continuous seconds, a severity level of "heavy" when a vehicle is driven at least 20 miles per hour over the legal speed limit for at least 200 continuous seconds, and a severity level of "severe" when a vehicle is driven at least 25 miles per hour over the legal speed limit for at least 100 continuous seconds.

By way of further example, a user may specify that for cars and SUVs a severity level of "light" occurs when a vehicle is driven at least 20 miles per hour over the legal speed limit for at least 400 continuous seconds, a severity level of "moderate" when a vehicle is driven at least 25 miles per hour over the legal speed limit for at least 300 continuous seconds, a severity level of "heavy" when a vehicle is driven at least 30 miles per hour over the legal speed limit for at least 250 continuous seconds, and a severity level of "severe" when a vehicle is driven at least 40 miles per hour over the legal speed limit for at least 200 continuous seconds. By contrast, a user may specify that for panel vans a severity level of "light" occurs when a vehicle is driven at least 10 miles per hour over the legal speed limit for at least 300 continuous seconds, a severity level of "moderate" when a vehicle is driven at least 15 miles per hour over the legal speed limit for at least 250 continuous seconds, a severity level of "heavy" when a vehicle is driven at least 20 miles per hour over the legal speed limit for at least 200 continuous seconds, and a severity level of "severe" when a vehicle is driven at least 25 miles per hour over the legal speed limit for at least 100 continuous seconds. Further, a user may specify that for "big rigs" (e.g., 18 wheelers or larger) a severity level of "light" occurs when a vehicle is driven at least 5 miles per hour over the legal speed limit for at least 200 continuous seconds, a severity level of "moderate" when a vehicle is driven at least 10 miles per hour over the legal speed limit for at least 250 continuous seconds, a severity level of "heavy" when a vehicle is driven at least 15 miles per hour over the legal speed limit for at least 200 continuous seconds, and a severity level of "severe" when a vehicle is driven at least 20 miles per hour over the legal speed limit for at least 100 continuous seconds.

By way of further example, a user may specify that for vehicles transporting packages a severity level of "light" occurs when a vehicle is driven at least 20 miles per hour over the legal speed limit for at least 400 continuous seconds, a severity level of "moderate" when a vehicle is driven at least 25 miles per hour over the legal speed limit for at least 300 continuous seconds, a severity level of "heavy" when a vehicle is driven at least 30 miles per hour over the legal speed limit for at least 250 continuous seconds, and a severity level of "severe" when a vehicle is driven at least 40 miles per hour over the legal speed limit for at least 200 continuous seconds. By contrast, a user may specify that for vehicles transporting people a severity level of "light" occurs when a vehicle is driven at least 10 miles per hour over the legal speed limit for at least 300 continuous seconds, a severity level of "moderate" when a vehicle is driven at least 15 miles per hour over the legal speed limit for at least 250 continuous seconds, a severity level of "heavy" when a vehicle is driven at least 20 miles per hour over the legal speed limit for at least 200 continuous seconds, and a severity level of "severe" when a vehicle is driven at least 25 miles per hour over the legal speed limit for at least 100 continuous seconds. Further, a user may specify that for vehicles transporting dangerous substances (e.g., environmental waste, radioactive materials, etc.) a severity level of "light" occurs when a vehicle is driven at least 5 miles per hour over the legal speed limit for at least 100 continuous seconds, a severity level of "moderate" when a vehicle is driven at least 8 miles per hour over the legal speed limit for at least 75 continuous seconds, a severity level of "heavy" when a vehicle is driven at least 10 miles per hour over the legal speed limit for at least 50 continuous seconds, and a severity level of "severe" when a vehicle is driven at least 15 miles per hour over the legal speed limit for at least 20 continuous seconds.

Referring again to FIG. 3A, the user interface provides a control via which a maximum speed may be specified (e.g., as a miles per hour above a legal speed limit) for an organization and/or a fleet of vehicles, as well as a control via which a minimum time duration may be specified. Thus, in order for a vehicle speed to be considered to exceed the maximum legal speed limit, the vehicle needs to be driven at least the specified miles per hour above the legal speed limit for at least the specified time duration. Optionally, controls may be provided that enable different maximum speeds to be specified for different drivers, for different sets of drivers, for different vehicles, for different sets of vehicles, for different vehicle types, for different items being transported by a given vehicle, for different environmental conditions, for different road types, for different times of day, for different times of year, and/or based on other criteria.

Referring yet again to FIG. 3A, the user interface provides a control via which rolling stop detection may be enabled. When rolling stop detection is enabled, a rolling stop violation may be determined when a vehicle does not fully stop at a designated stop (e.g., a stop sign, a traffic light red light).

Referring to FIG. 3C, an example speed report is illustrated. Optionally, a control may be provided via which a user may specify the period of time that the report is to cover (e.g., the last 30 days, the last year, a specified start date-end date, and/or the like). The example report includes a control via which the user can specify whether the report is to be generated for drivers or for vehicles. In this example, "drivers" has been selected. The number of drivers for which the report is generated may be accessed by the system and presented via the user interface. As discussed elsewhere herein, a driver safety score may be generated using, for example, the number and type of speeding events. The generated user interface may report the speeding impact on the drivers' safety score for the specified period of time. For example, the score impact may indicate the change (positive or negative) in the safety score over the specified time period in terms of the change in score points and/or in the percentage change in the score. The report may include other events of interest that are detected.

Referring again to FIG. 3C, a behavior breakdown is provided. The behavior breakdown data indicates for each severity level, the effect that severity level has on the safety score (e.g., in terms of the number of points and/or in terms of the percentage change), and the percentage of drive time and the amount of drive time that was spent at each severity level (e.g., for a particular driver, a subset of drivers, all drivers, a particular vehicle, a subset of vehicles, and/or all vehicles). A graph is provided depicting speeding trends for a given period of time. Controls are provided via which the user may select among score impact trends, speeding percentage trends, and speeding events trends. The illustrated graph depicts score impact by week.

Referring yet again to FIG. 3C, a ranking of drivers is provided. The ranking may be based on respective driver scores. The ranking may provide, for a given driver, the driver rank, the driver name, the safety score impact from speeding events, the safety score change (in points), the number of hours driven, the percent of driving time and amount driving time that was over a reference speed limit (e.g., the legal/posted speed limit), the percentage of driving time and amount of driving time spent at each speeding severity category, and the number of speeding events at each severity level.

Referring now to FIG. 3D, the example user interface depicts a breakdown of speeding categories per trip (with a designated starting location and a designated ending location). For a given trip, the starting location (e.g., the location address, latitude and longitude, and/or other location identifier), start time, ending location (e.g., the location address, latitude and longitude, and/or other location identifier), and end time are reported. In addition, for a given trip, the total percentage of time speeding over the corresponding reference speed limit (e.g., the legal/posted speed limit), the total number of speeding events, and the total time spent speeding are reported. Further, the percentage of time speeding over the corresponding reference speed limit (e.g., the legal/posted speed limit), the number of speeding events, and the time spent speeding for each speeding severity category are reported.

Referring now to FIG. 3E, the example user interface depicts detailed trip data. As illustrated, a map of the trip route is presented. The map identifies the trip starting location, starting date/time, ending location, and ending date/time, as well as the trip time duration. Optionally, respective portions of the depicted trip route are color-coded or otherwise annotated to indicate respective speeding severity levels and/or speed limits. In addition, the vehicle that executed the trip and the driver of the vehicle are identified. A graph is provided that indicates the vehicle speed in the vertical axis and the trip time in the horizontal axis. In response to a user pointing at a given point in the graph (e.g., by hovering a cursor or touching a given graph point) certain detailed information is accessed and presented regarding the selected point, such as the time corresponding to the selected point, the vehicle speed at the selected point, the speeding severity category at the selected point, the number of miles per hour above the speed limit at the selected point, and the speed limit at the selected point. In addition, for each speeding event, the maximum speed, the maximum speed over the speed limit, and the reference speed limit (e.g., the legal/posted speed limit). An edit speed limit control is provided in association with a given speed limit, which when activated, enables the user to edit the reference speed limit.

Figure 3G:
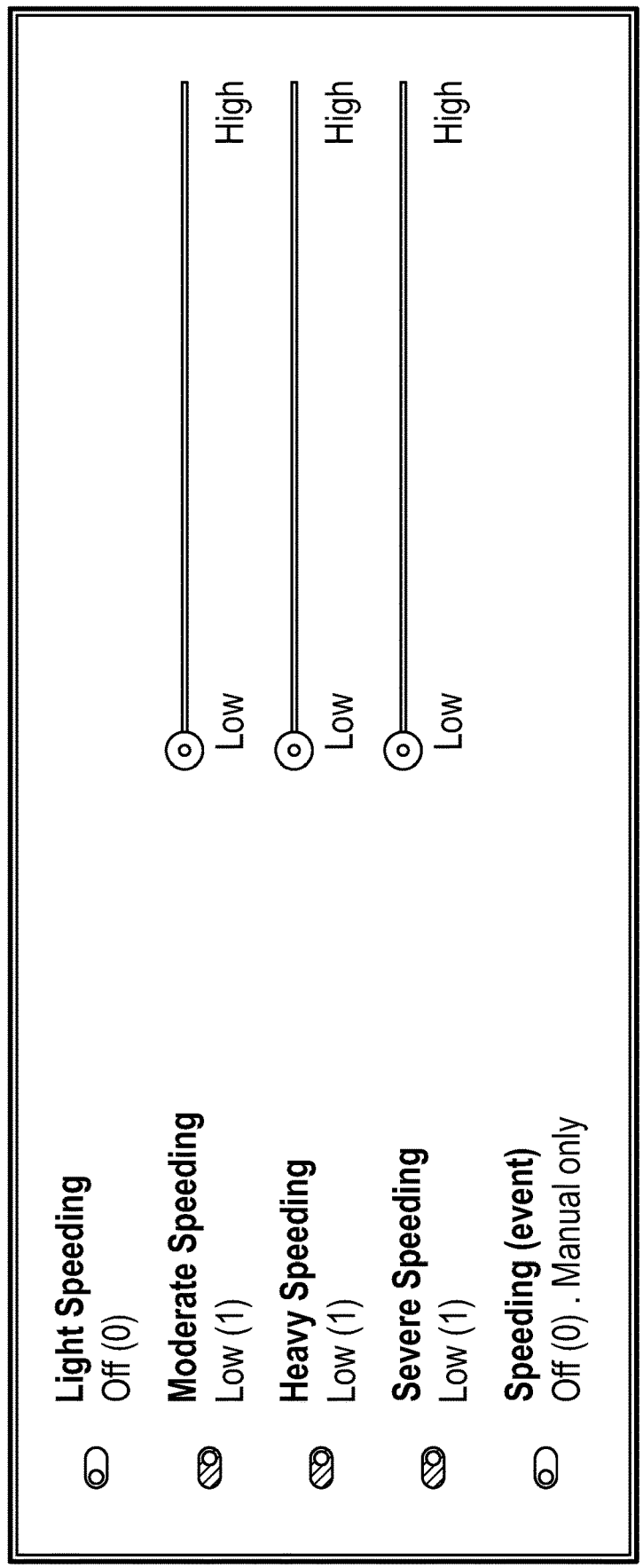
Figure 3I:
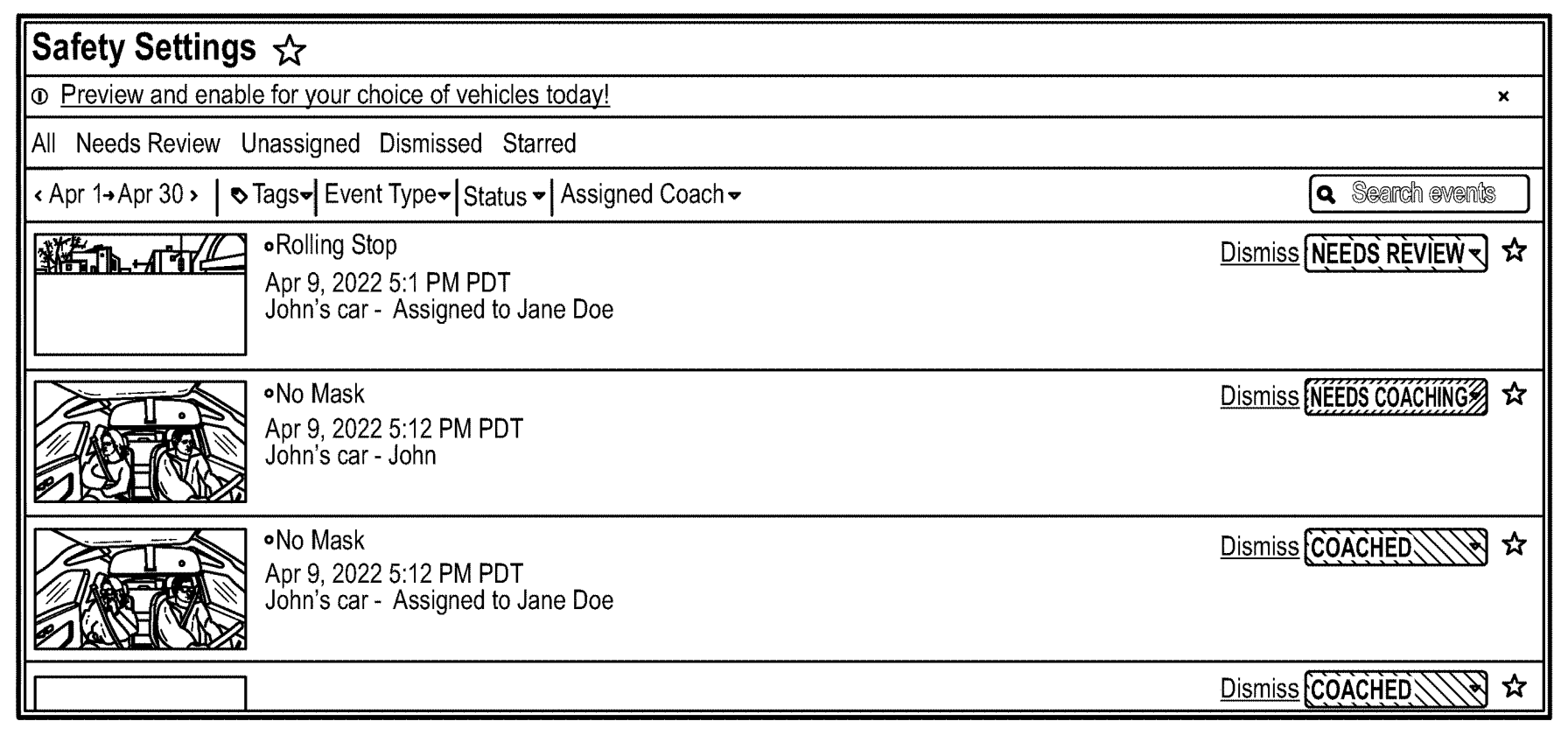

Referring now to FIG. 3F, the example user interface provides controls via which a safety score configuration and a safety score target may be specified. For example, the safety score configuration control, when activate, may cause the user interface illustrated in FIG. 3G to be rendered. The user interface illustrated in FIG. 3G may enable a user to set the relative importance of safety scores and the weights of safety infractions. By way of example, slider controls are provided via which a weighting may be assigned to each speeding severity level. The weights may be used in determining how much a given speeding severity level will impact a safety score for a given driver or set of drivers.

The safety score target user interface may enable a user to set a safety score target for a set of vehicles (e.g., a fleet of vehicles). The safety score target may be displayed via one or more user interfaces or other documents described herein. Optionally, a delta safety score may be calculated that indicates how much the safety score for the set of vehicles differs (e.g., is higher or lower) that the safety score target. The safety score and the safety score delta may be displayed together. A graph of the safety score delta over time may be generated and displayed.

Referring now to FIG. 3H, the example user interface enables coaching (e.g., in how to be a better and/or safer driver) to be automatically assigned to one or more drivers in response to one or more events. Such events may be a safety score falling below a certain threshold, a safety score being below a certain threshold for a specified period of time, the occurrence of a speeding event at a specified speeding severity level, a quantity of speeding events of specified speeding severity level(s) within a specified period of time, an amount of time at a specified speeding severity level, a percentage of driving time spent at one or more specified speeding severity levels, and/or the like. A control may be provided that enables or disables the provision of a notification (e.g., via email, text, or otherwise) of the coaching assignment to the respective coach(es). The user interface enables on or more coaching triggering events to be specified. The user interface may display the number of drivers that currently have coaches assigned.

Referring now to FIG. 3I, the example user interface may be configured to enable the management of harsh events, such as speeding events. The example user interface provides an in box of event entries in the form messages regarding safety events or other harsh events, such as speeding events. Optionally, a filter may be utilized to filter out messages for safety events whose severity fails to meet certain criteria. For example, messages regarding speeding events of a severity level less than a certain threshold (e.g., having a speeding severity level less than a severity level of "heavy") may be inhibited (e.g., filtered out, not generated, not transmitted) thereby reducing computer resource utilization (e.g., processor utilization, memory utilization, network bandwidth, display area, and/or the like) that would otherwise be needed to generate, transmit, and/or display the message. Filter controls may be provided via which the user can specify a time frame for which messages are to be displayed, specify message tags that need to present in order for a given message to be displayed, specify event types (e.g., different safety event-types, different speeding severity level events, etc.) for which messages are to be displayed, specify an event status that needs to be present for a given message to be displayed (e.g., reviewed, coach to be assigned, coach assigned, coaching completed, etc.), and/or specify an assigned coach for which messages are to be displayed.

Referring now to FIG. 3J, the example user interface may be configured to specify various voice coaching parameters, where the voice coaching may optionally be provided in substantially real time (e.g., within 1-30 minutes) in response to one or more specified events. The voice coaching may be provided via a vehicle device while the vehicle is being driven or while the vehicle is stopped. For example, the coaching may be provided by a remote coach via a coach device. The user interface enables a coaching language to be specified. In addition, the user interface enables the user to specify what events are to trigger the initiation of voice coaching, such as a crash or speeding event. With respect to a speeding event, the user interface enables a threshold speed delta to be specified, wherein if the vehicle speed is above a threshold (in terms of miles per hour or in terms of a percent) relative to a reference speed (e.g., a legal/posted speed), a coaching event is triggered. Other voice coaching event triggers may be specified, such as detection of an unbuckled seatbelt of a person in the vehicle, or harsh driving (e.g., unsafe acceleration or braking).

A given message may include an image of the corresponding event, text and/or an icon indicating the event type, date/time of the event, an identification of the driver, an identification of a vehicle, and/or an identification of a coach assigned to the driver. A control (e.g., a dropdown menu) may be provided via which the user can assign or change a status associated with the event (e.g., reviewed, coach to be assigned, coach assigned, coaching completed, etc.). The messages may be automatically sorted or ranked in response to severity and/or recentness, so that the messages corresponding to the more severe and/or recent harsh events (e.g., speeding events) are presented first.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   one or more a computer readable non-transitory storage mediums having program instructions embodied therewith; and
   one or more processors configured to execute the program instructions to cause the system to:
   provide an interface enabling a plurality of speeding severity levels to be defined, wherein a definition of a given speeding severity level in the plurality of speeding severity levels comprises a delta speed difference or percentage speed difference relative to a reference speed limit, and a corresponding time duration;
   receive, via the interface, definitions for a plurality of speeding severity levels comprising respective delta speed differences or respective percentage speed difference relative to the reference speed limit, and respective corresponding time durations;
   receive over a network, from a vehicle device, speed data and associated time data for a plurality moments in time, while a vehicle is traversing a route;
   determine, based at least on the speed data and associated time data for the plurality moments in time a corresponding speeding severity level;
   determine, based at least in part on the determined corresponding speeding severity level whether the vehicle device is to provide a corresponding driver alert;
   at least partly in response to a determination, based at least in part on the determined corresponding speeding severity level that a driver alert is to be provided via the vehicle device, transmit a communication over the network to the vehicle device configured to cause the vehicle device to provide a corresponding in-vehicle driver alert; and
   generate an interactive user interface comprising: a map of at least portion of the route being traversed by the vehicle, an identification of the driver, an identification of the vehicle, and a graph of the vehicle while traversing the route, wherein in response to a portion of the graph being pointed at, an indication as to the vehicle's speeding severity level for at least one point on the route and the vehicle speed is displayed.

2. The system of claim 1, the system further configured to adjust one or more speeding severity level definitions using a learning engine, wherein the learning engine utilizes vehicle speed-related data, environmental data corresponding the route being traversed by the vehicle, and driver safety data in determining that adjustments for the one or more speeding severity level definitions.

3. The system of claim 1, wherein the interface enabling the plurality of speeding severity levels to be defined, wherein the definition of a given speeding severity level in the plurality of speeding severity levels comprises a delta speed difference or percentage speed difference relative to a reference speed limit, and a corresponding time duration, comprises a user interface.

4. The system of claim 1, the system further configured to:
generate and/or adjust a driver safety indicator based at least in part on a quantity of speeding events over a given period of time, respective speeding severity levels, and respective weights associated with the respective speeding severity levels.

5. The system of claim 1, the system further configured to:
determine for a given speeding event in a plurality of speeding events, whether or not a notification is to be transmitted to one or more destinations other than the vehicle device; and
inhibit transmission of a notification for a given speeding event in response to determining that a notification is not to be transmitted to the one or more destinations.

6. The system of claim 1, the system further configured to:
generate a safety event management user interface displaying a plurality of safety related event entries, wherein a given safety related event entry identifies a safety related event type, timing associated with the given safety related event entry, an identification of a driver involved with the given safety related event entry, an identification of a vehicle associated with the given safety related event entry;
provide a control in association with a given safety related event entry that enables an action and/or status to be associated with the given safety related event entry; and
provide a plurality of filter controls that enable the display of the plurality of safety related event entries to be filtered so as to display those safety related event entries that satisfy activation of one or more of the plurality of filter controls.

7. A method performed by an event analysis system having one or more hardware computer processors and one or more non-transitory computer readable storage devices storing software instructions executable by the computing system, the method comprising:
providing an interface enabling a plurality of speeding severity levels to be defined, wherein a definition of a given speeding severity level in the plurality of speeding severity levels comprises a delta speed difference or percentage speed difference relative to a reference speed limit, and a corresponding time duration;
receiving, via the interface, definitions for a plurality of speeding severity levels comprising respective delta speed differences or respective percentage speed difference relative to the reference speed limit, and respective corresponding time durations;
receiving over a wireless network from a vehicle device, speed data and associated time data for a plurality moments in time, while a vehicle is traversing a route;
determining, based at least on the speed data and associated time data for the plurality moments in time a corresponding speeding severity level;
determining, based at least in part on the determined corresponding speeding severity level whether the vehicle device is to provide a corresponding driver alert;
at least partly in response to determining, based at least in part on the determined corresponding speeding severity level that a driver alert is to be provided via the vehicle device, transmitting a communication over the wireless network to the vehicle device configured to cause the vehicle device to provide a corresponding in-vehicle driver alert; and
generating an interactive user interface comprising: a map of at least portion of the route being traversed by the vehicle, an identification of the driver, an identification of the vehicle, and a graph of the vehicle while traversing the route, wherein in response to a portion of the graph being pointed at, an indication as to the vehicle's speeding severity level for at least one point on the route and the vehicle speed is displayed.

8. The method of claim 7, the method further comprising setting and/or adjusting one or more speeding severity level definitions using a learning engine, wherein the learning engine utilizes vehicle speed-related data, environmental data corresponding the route being traversed by the vehicle, and driver safety data in determining that adjustments for the one or more speeding severity level definitions.

9. The method of claim 7, wherein the interface enabling the plurality of speeding severity levels to be defined, wherein the definition of a given speeding severity level in the plurality of speeding severity levels comprises a delta speed difference or percentage speed difference relative to a reference speed limit, and a corresponding time duration, comprises a user interface.

10. The method of claim 7, the method further comprising:
generating and/or adjusting a driver safety indicator based at least in part on a quantity of speeding events over a given period of time, respective speeding severity levels, and respective weights associated with the respective speeding severity levels.

11. The method of claim 7, the method further comprising:
determining for a given speeding event in a plurality of speeding events, whether or not a notification is to be transmitted to one or more destinations other than the vehicle device; and
inhibiting transmission of a notification for a given speeding event in response to determining that a notification is not to be transmitted to the one or more destinations.

12. The method of claim 7, the method further comprising:
generating a safety event management user interface displaying a plurality of safety related event entries, wherein a given safety related event entry identifies a safety related event type, timing associated with the given safety related event entry, an identification of a driver involved with the given safety related event entry, an identification of a vehicle associated with the given safety related event entry;
providing a control in association with a given safety related event entry that enables an action and/or status to be associated with the given safety related event entry; and providing a plurality of filter controls that enable the display of the plurality of safety related event entries to be filtered so as to display those safety related event entries that satisfy activation of one or more of the plurality of filter controls.

\* \* \* \* \*